US009043339B2

(12) United States Patent
Ikawa et al.

(10) Patent No.: US 9,043,339 B2
(45) Date of Patent: *May 26, 2015

(54) EXTRACTING TERMS FROM DOCUMENT DATA INCLUDING TEXT SEGMENT

(71) Applicant: International Business Machines Corporation, Armonk, NY (US)

(72) Inventors: Yohei Ikawa, Kanagawa-ken (JP); Shiho Negishi, Kanagawa-ken (JP); Hironori Takeuchi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,020

(22) Filed: May 21, 2013

(65) Prior Publication Data

US 2013/0253916 A1 Sep. 26, 2013

Related U.S. Application Data

(63) Continuation of application No. 13/121,982, filed as application No. PCT/JP2009/063584 on Jul. 30, 2009, now Pat. No. 8,463,794.

(30) Foreign Application Priority Data

Oct. 2, 2008 (JP) .................................. 2008-257388
Jul. 30, 2009 (JP) .................................. 2010-531786

(51) Int. Cl.
*G06F 17/30* (2006.01)
*G06F 17/28* (2006.01)
*G06F 17/27* (2006.01)

(52) U.S. Cl.
CPC .............. *G06F 17/28* (2013.01); *G06F 17/277* (2013.01); *G06F 17/30719* (2013.01)

(58) Field of Classification Search
CPC .. G06F 17/30707; G06F 17/28; G06F 17/277
USPC ......................................................... 707/748
See application file for complete search history.

(56) References Cited

U.S. PATENT DOCUMENTS 5,619,410 A * 4/1997 Emori et al. ...................... 704/7
5,715,468 A    2/1998 Budzinski
(Continued)

FOREIGN PATENT DOCUMENTS

JP        9190438 A     7/1997
JP       10177575       6/1998
(Continued)

*Primary Examiner* — Jorge A Casanova
(74) *Attorney, Agent, or Firm* — Cantor Colburn LLP; Gail Zarick

(57) ABSTRACT

A computer system, method, and article of manufacture for extracting a term from electronic document data that includes a text segment. The system includes: a first extraction unit that uses a first text processing information to extract a noun word from the document data; a second extraction unit that uses a second text processing information to extract a term candidate in relation to the noun word or a corpus that includes text data described in the same language used in the document data; a weight assignment unit that uses a third text processing information to select which type to assign a weight from the plurality of types and assigns the weight to the selected type for each noun word and term candidate; a determination unit that determines the type to which the noun word and term candidate belong; and an output unit to output the noun word and term candidate.

18 Claims, 20 Drawing Sheets

(56) References Cited

U.S. PATENT DOCUMENTS

| | | |
|---|---|---|
| 6,205,456 B1 * | 3/2001 | Nakao .......................... 715/201 |
| 6,999,963 B1 | 2/2006 | McConnell |
| 7,191,177 B2 * | 3/2007 | Konaka ........................ 707/758 |
| 7,349,840 B2 | 3/2008 | Budzinski |
| 7,512,609 B2 | 3/2009 | McConnell |
| 7,640,254 B2 | 12/2009 | McConnell |
| 8,024,329 B1 | 9/2011 | Rennison |
| 8,135,728 B2 | 3/2012 | Yih et al. |
| 8,166,045 B1 | 4/2012 | Mazumdar et al. |
| 8,214,346 B2 | 7/2012 | Pradhan et al. |
| 8,234,263 B2 | 7/2012 | Pradham et al. |
| 8,290,946 B2 | 10/2012 | Yih et al. |
| 2001/0013029 A1 * | 8/2001 | Gilmour .......................... 707/1 |
| 2004/0029085 A1 * | 2/2004 | Hu et al. ...................... 434/178 |

FOREIGN PATENT DOCUMENTS

| | | |
|---|---|---|
| JP | 2004151882 A | 5/2004 |
| JP | 2005196513 A | 7/2005 |

\* cited by examiner

| TYPE OF NOUN WORD | DESCRIPTION | EXAMPLE |
|---|---|---|
| COMPONENT | TERM REPRESENTING MODULE (COMPONENT) NAME, FUNCTION NAME, OR OTHERS | "POWER SUPPLY BUTTON", "SPEED ADJUSTMENT FUNCTION" |
| PARAMETER | TERM REPRESENTING ATTRIBUTE NAME, DATA NAME, OR PARAMETER NAME (ATTRIBUTE WHICH ONLY SPECIFIC COMPONENTS HAVE) | "MAXIMUM OUTPUT NUMBER", "MINIMUM SPEED" |
| SCHEMA | TERM WHICH MAY BECOME SCHEMA (COLUMN TITLE OF TABLE) OF DATABASE (ATTRIBUTE WHICH ALL COMPONENTS HAVE) | "FUNCTION", "COMPONENT", "INPUT", "OUTPUT" |

FIG. 1C

- *HADOWEA KOUSEI (HARDWARE CONFIGURATION)*
  KONO (THIS) *KEITAITANMATSU (MOBILE TERMINAL)* HA
  *DENWA (CALL)* WO KAKERU (MAKE) KOTOGADEKIRU (CAN).
  *BOTAN (BUTTON)* NIYORI (BY) SOUSASHI (OPERATE),
  SETTEISARETA (SET) *JOUHOU (INFORMATION)* GA
  HYOUJISARERU (IS DISPLAYED).
    - *BOTAN A* NO *IRO (COLOR)* HA *AKA (RED)* DE,
      *CHAKUSHINJI (AT INCOMING CALL)* NI
      TENMETSUSURU (BLINKS).
    - *BOTAN B* NO *IRO* HA *MIDORI (GREEN)* DE,
      *ERAJI (AT ERROR)* NI HIKARU (FLASHES).
    - *DISUPUREI (DISPLAY)* NI SETTEISARETA *JOUHOU* GA
      HYOUJISARERU.
- *KINOU (FUNCTION)* NO *SETSUMEI (DESCRIPTION)*
  KONO *KEITAITANMATSU* DE RIYOUDEKIRU (AVAILABLE)
  *KINOU* NITSUITE (ABOUT) SETSUMEISURU (WILL BE DESCRIBED).
  *DENWA* WO KAKERU (MAKE) DAKEDENAKU (NOT ONLY),
  SAMAZAMANA (VARIOUS) *JOUHOU* WO HYOUJISURUKOTOGA
  DEKIRU (CAN BE DISPLAYED).
  *KINOU* NO *RISUTO (LIST)* WO IKANISHIMESU (IS SHOWN BELOW).
    - *BOTAN A* WO OSUTO (WHEN PUSHED) *DENWA* WO KAKERU
    - *BOTAN B* WO OSUTO *DISUPUREI* NO *AKARUSA (BRIGHTNESS)* WO
      CHOUSEISURU (IS ADJUSTED)
    - *BOTAN X* WO OSUTO HYOUJISURU (DISPLAYED) *JOUHOU* WO
      HENKOUSURU (IS CHANGED)

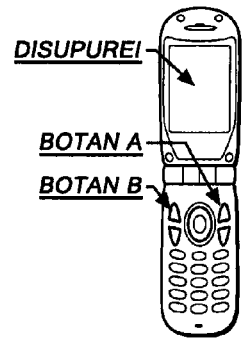

| ID | MEISHOU (NAME) | KINOU NO GAIYOU (OUTLINE) | IRO |
|---|---|---|---|
| 01 | DISUPUREI | JOUHOU WO HYOUJISURU (DISPLAY) | - |
| 02 | BOTAN A | DENWA WO KAKERU | AKAIRODE CHAKUSHINJI NI HIKARU |
| 03 | BOTAN B | DISUPUREI NO AKARUSA WO CHOUSEISURU | MIDORIIRO DE ERAJI NI HIKARU |
| ... | ... | ... | ... |
|  |  |  |  |

FIG. 6A

- HADOWEA KOUSEI
    KONO KEITAITANMATSU HA DENWA WO KAKERU
    KOTOGADEKIRU. BOTAN NIYORI SOUSASHI,
    SETTEISARETA JOUHOU GA HYOUJISARERU.
    - *BOTAN A* NO IRO HA AKA DE, CHAKUSHINJI NI
       TENMETSUSURU.
    - *BOTAN B* NO IRO HA MIDORI DE, ERAJI NI HIKARU.
    - *DISUPUREI* NI SETTEISARETA JOUHOU GA
       HYOUJISARERU.
- KINOU NO SETSUMEI
    KONO KEITAITANMATSU DE RIYOUDEKIRU KINOU
    NITSUITE SETSUMEISURU.
    DENWA WO KAKERU DAKEDENAKU, SAMAZAMANA
    JOUHOU WO HYOUJISURUKOTOGDEKIRU.
    KINOU NO RISUTO WO IKANISHIMESU.
    - *BOTAN A* WO OSUTO DENWA WO KAKERU
    - *BOTAN B* WO OSUTO *DISUPUREI* NO
       AKARUSA WO CHOUSEISURU
    - *BOTAN X* WO OSUTO HYOUJISURU JOUHOU
       WO HENKOUSURU

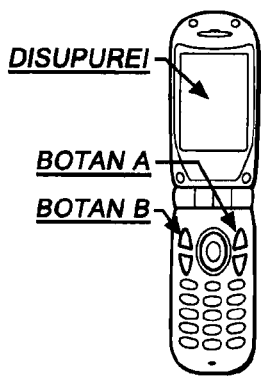

*DISUPUREI*

*BOTAN A*

*BOTAN B*

| *ID* | *MEISHOU* | KINOU NO GAIYOU | *IRO* |
|---|---|---|---|
| 01 | *DISUPUREI* | JOUHOU WO HYOUJISURU | - |
| 02 | *BOTAN A* | DENWA WO KAKERU | AKAIRODE CHAKUSHINJI NI HIKARU |
| 03 | *BOTAN B* | *DISUPUREI* NO AKARUSA WO CHOUSEISURU | MIDORIIRO DE ERAJI NI HIKARU |
| ... | ... | ... | ... |
|  |  |  |  |

FIG. 6B

- HADOWEA KOUSEI
  KONO KEITAITANMATSU HA DENWA WO KAKERU
  KOTOGADEKIRU.  BOTAN NIYORI SOUSASHI,
  SETTEISARETA JOUHOU GA HYOUJISARERU.
    - *BOTAN A* NO IRO HA AKA DE,
      CHAKUSHINJI NI TENMETSUSURU.
    - *BOTAN B* NO IRO HA MIDORI DE,
      ERAJI NI HIKARU.
    - *DISUPUREI* NI SETTEISARETA JOUHOU
      GA HYOUJISARERU.
- KINOU NO SETSUMEI
  KONO KEITAITANMATSU DE RIYOUDEKIRU KINOU
  NITSUITE  SETSUMEISURU.
  DENWA WO KAKERU DAKEDENAKU, SAMAZAMANA
  JOUHOU WO HYOUJISURUKOTOGDEKIRU.
  KINOU NO RISUTO  WO IKANISHIMESU.
    - *BOTAN A* WO OSUT(
    - *BOTAN B* WO OSUT( _____
      AKARUSA WO CHOUSEISURU
    - *BOTAN X* WO OSUTO HYOUJISURU
      JOUHOU WO HENKOUSURU

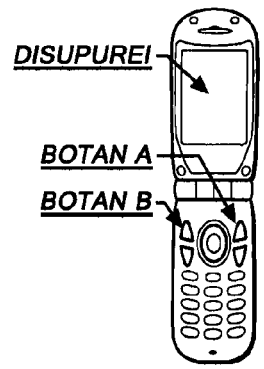

| ID | MEISHOU | KINOU NO GAIYOU | IRO |
|---|---|---|---|
| 01 | *DISUPUREI* | JOUHOU WO HYOUJISURU | - |
| 02 | *BOTAN A* | DENWA WO KAKERU | AKAIRODE CHAKUSHINJI NI HIKARU |
| 03 | *BOTAN B* | *DISUPUREI* NO AKARUSA WO CHOUSEISURU | MIDORIIRO DE ERAJI NI HIKARU |
| ... | ... | ... | ... |
|  |  |  |  |

| LEGEND | *RED*: COMPONENT |
|---|---|
|  | GREEN: PARAMETER |
|  | YELLOW: SCHEMA |

FIG. 6C

| NOUN WORD | FIGS. 3A TO 3B | SEED EXPRESSION (YES OR NO) | FIGS. 5A TO 5F | | | IMPORTANCE |
| --- | --- | --- | --- | --- | --- | --- |
| | | | Vc | Vp | Vs | |
| DISUPUREI | 2W+3Z | y | A | 0 | 0 | A |
| BOTAN A | 2W+2Z | y | A | 0 | 0 | A |
| BOTAN B | 2W+3Z | y | A | 0 | 0 | A |
| BOTAN X | Z | n | B | 0 | 0 | B |
| IRO | W+2Z | y | 0 | A | B+D | A |
| ID | W | y | 0 | A | B+C | B+C |
| MEISHOU | W | y | 0 | A | B+C | B+C |
| JOUHOU | 5Z | n | | | | |
| DENWA | 4Z | n | | | | |
| KINOU | 2Y | n | | | | |
| KEITAITANMATSU | 2Z | n | | | | |

FIG. 6D

CONVENTIONAL NOUN WORD
EXTRACTION
(TERMS INTENDED TO BE EXTRACTED
ARE UNDERLINED)

| EXTRACTED NOUN WORD | FREQUENCY |
|---|---|
| JOUHOU | 5 |
| DENWA | 4 |
| KINOU | 4 |
| *DISUPUREI* | 4 |
| *BOTAN A* | 3 |
| *BOTAN B* | 3 |
| KEITATANMATSU | 2 |
| *IRO* | 2 |
| ... | ... |
|  |  |

NOUN WORD EXTRACTION
OF EMBODIMENT
OF PRESENT INVENTION

| COMPONENT | IMPORTANCE |
|---|---|
| DISUPUREI | 100 |
| BOTAN A | 100 |
| BOTAN B | 100 |
| BOTAN X | 70 |

| PARAMETER | IMPORTANCE |
|---|---|
| IRO | 100 |

| SCHEMA | IMPORTANCE |
|---|---|
| ID | 110 |
| MEISHOU | 110 |

FIG. 6E

EXTRACTING TERMS FROM DOCUMENT DATA INCLUDING TEXT SEGMENT

CROSS-REFERENCE TO RELATED APPLICATIONS

The present application is a continuation of U.S. patent application Ser. No. 13/121,982 filed on Jul. 30, 2009, which claims priority from (i) International Application PCT/JP2009/063584, filed on Jul. 30, 2009, (ii) Japanese Application Number 2008-257388, filed in Japan on Oct. 2, 2008, now abandoned, and (iii) Japanese Application Number 2010-531786, filed in Japan on Jul. 30, 2009, now Japanese Patent No. 5,106,636, issued on Oct. 12, 2012, the contents of all of which are incorporated herein by reference in their entirety.

BACKGROUND

The present invention relates to a computer system, a method, and a computer program for extracting terms from document data that includes a text segment.

Nowadays, there are tremendous amounts of technical documents, e.g., requirement documents and specification documents. Thus, techniques to promptly understand the content of the technical documents are required. Extracting and presenting terms which appear in a technical document is a useful solution for prompt understanding. Many methods of extracting terms from a text have been proposed. However, simply extracting terms results in a mere enumeration of many terms. Since general methods of extracting terms are not specialized for technical documents, a user needs to manually classify types of the terms after the terms have been extracted. Thus, application of such methods to technical documents is impractical.

Meanwhile, there is known technique called the named entity (NE) extraction technique, i.e., a technique for automatically extracting terms of a specific type such as a personal name, place name, or organization name. The NE extraction technique requires development of a dictionary for extracting the terms and of an extraction rule. In order to create such a dictionary, a user must scrutinize the content of a technical document, and then determine which words are to be extracted as terms. However, this technique is tremendously costly.

Japanese Patent Application Publication No. Hei 10-177575 describes calculating a temporary importance and calculating a formal importance based on the temporary importance. Specifically, a predetermined phrase is extracted from text data and a temporary importance is calculated based on information on at least one of words, parts of speech, and segments included in the extracted phrase. Then, a formal importance is calculated from the temporary importance in accordance with an appearance state of the phrase in the text data.

SUMMARY OF THE INVENTION

According to one aspect of the present invention, a computer-implemented system is provided for extracting a term from electronic document data that includes a text segment. The computer system includes: a first extraction unit that uses a first text processing information to extract a noun word from the document data; a second extraction unit that uses a second text processing information to extract a term candidate in relation to the extracted noun word from the document data or from a corpus that includes text data described in the same language used in the document data; a weight assignment unit that, in order to determine which one of a plurality of noun word types the extracted noun word and the extracted term candidate each belong to, uses a third text processing information to select which type to assign a weight from the plurality of types and assigns the weight to the selected type for each of the extracted noun word and the extracted term candidate; a determination unit that determines the type to which the extracted noun word and the extracted term candidate each belong, based on the assigned weight; and an output unit which follows the determination to output the extracted noun word and the extracted term candidate each in association with the determined type.

According to another aspect of the present invention, a computer-implemented method is provided for extracting a term from electronic document data that includes a text segment. The method causes a computer system to execute the following steps. The steps include the steps of: using a first text processing information to extract a noun word from the document data and storing the extracted noun word in a storage unit; using a second text processing information to extract a term candidate in relation to the extracted noun word from the document data or from a corpus including text data described in the same language used in the document data and storing the extracted term candidate in the storage unit; in order to determine which noun word type out of a plurality of types the extracted noun word and the extracted term candidate each belong to, using a third text processing information to select which type to assign a weight from the plurality of types, assigning the weight to the selected type for each of the extracted noun word and the extracted term candidate, and storing the assigned weight in the storage unit; determining the type to which the extracted noun word and the extracted term candidate each belong, based on the assigned weight; and following the determination to output the extracted noun word and the extracted term candidate each in association with the determined type onto a display device.

BRIEF DESCRIPTION OF THE DRAWINGS

FIG. 1C shows an example of types of noun words of the embodiment of the present invention.

FIG. 6A shows a result of noun word extraction according to a conventional method.

FIG. 6B shows a result of the seed expression extraction according to an example of the present invention.

FIG. 6C shows a result of term candidate extraction based on the seed expressions by using the text processing information, according to the example of the present invention.

FIG. 6D shows processing of calculating weight, according to the example of the present invention.

FIG. 6E shows comparison between the result of the conventional noun word extraction and the result of the noun word extraction according to the example of the present invention.

DETAILED DESCRIPTION

Embodiments of the present invention provide a method of utilizing the linguistic and structural characteristic of a document, particularly a technical document, to extract terms, automatically classifying the extracted terms in a useful way for an overall understanding or detailed understanding of the document, and presenting the classified terms to a user.

In the embodiments of the present invention, "document data" is electronic data of a document, and can be any type of document data as long as a text segment is included. The document data includes, but is not limited to, for example, document data created by word processor software, document data created by spreadsheet software, document data created by presentation sheet software, and document data that includes drawings and text data. A "document" is, but not limited to, a technical document including, for example, a requirement document, a specification document, a product documentation, and a design document.

In the embodiments of the present invention, a "text segment" is, for example, a structurally identifiable segment which includes a text of a minimum unit as a component of document data. If a segment does not change its meaning when connected with a preceding or following text, the segment is a text segment. If a segment changes its meaning when connected with a preceding or following text, the segment is not a text segment.

Figure 1A:
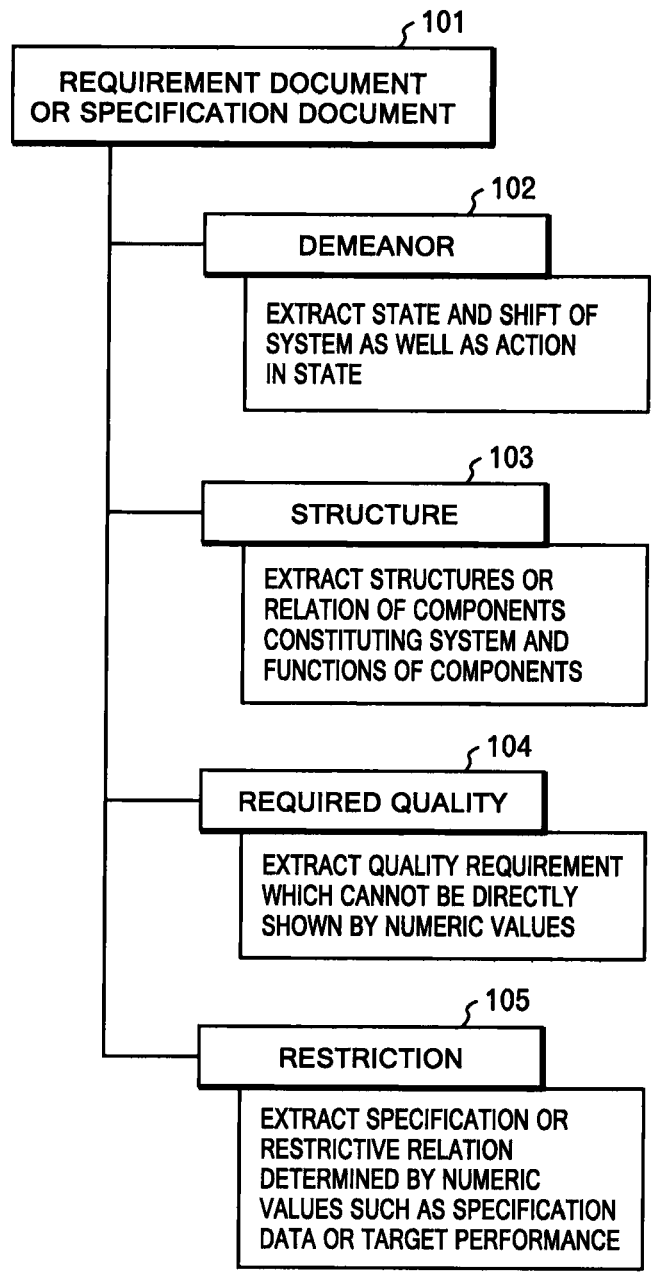
FIG. 1A shows information included in a technical document, e.g., a requirement document and specification document.
Figure 1B:
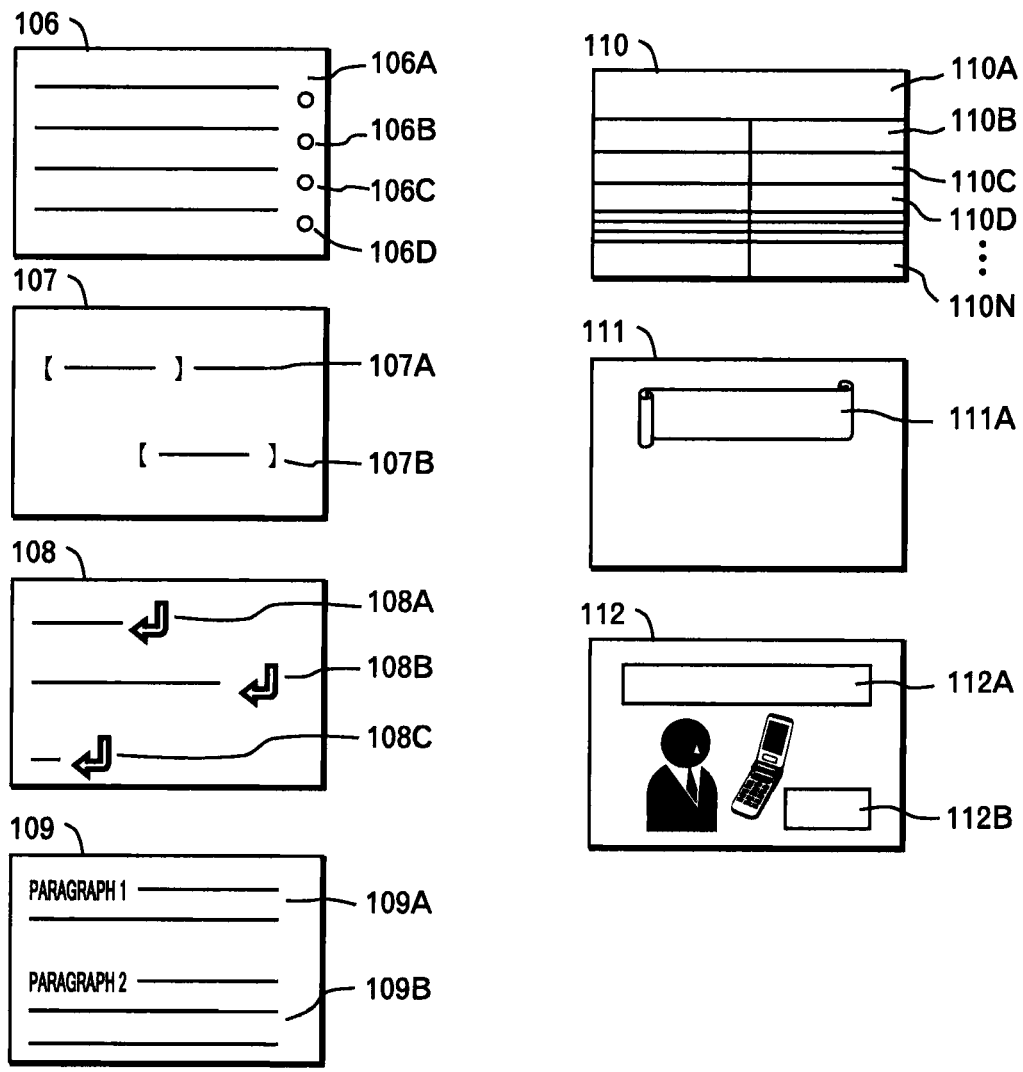
FIG. 1B shows an example of a text segment of an embodiment of the present invention.

As shown in FIG. 1B, a "structurally identifiable segment" includes, but is not limited to, a segment divided by a period, a segment divided in a tag unit, a segment divided by a line break, a segment divided by a paragraph, a segment formed of a cell of a table, a headline segment, and an in-drawing text segment.

In the embodiments of the present invention, although the definition of a "noun" may differ according to the language, a noun, in the Japanese language, falls under a self-sufficient word and is a part of speech which does not have conjugations. A noun includes a singular noun and a plural noun.

The Japanese language includes nouns classified as follows: a proper noun, a pronoun, a numeral (numerical noun), a formal noun, and a common noun. The English language includes nouns classified as follows: a proper noun, a common noun, a collective noun, a material noun, an abstract noun, a countable noun, and an uncountable noun.

In the embodiments of the present invention, a "corpus" is collected text (document) data. One example of the corpus is, but not limited to, a collection of machine-readable language documents and is huge text data formed of computerized natural language writings. In the embodiments of the present invention, since the corpus is to be described in the same language used in the document data, the corpus needs to be changed according to the language used in the document data. In order to efficiently extract terms, a corpus of a specific field (also referred to as a reference corpus below) is preferably used as the corpus in accordance with the content of the document data.

The corpus is stored in a storage device in a computer system being the embodiment of the present invention or in a storage device connected to the system. Alternatively, the corpus is stored in a storage device of a server system connected to the computer system via a network, e.g., a database server system, a proxy server system, or a provider server system.

In the embodiments of the present invention, "text processing information" is information obtained by text processing, e.g., parsing. The "text processing information" includes, for example, document structure information, language superficial information, language part-of-speech information, morphological analysis information, and word modification information.

In the embodiments of the present invention, "first text processing information" is particularly the document structure information, the language superficial information, the language part-of-speech information, the morphological analysis information, or a combination of these. Note that the word modification information can be used as the first text processing information.

The document structure information includes positional information of a text segment in document data and class information of an in-document object including a text segment. The positional information of a text segment in a document includes, for example, a hierarchical structure such as a chapter. The class information of an in-document object including a text segment includes, for example, a paragraph, a title, and a cell of a table.

Figure 3A:
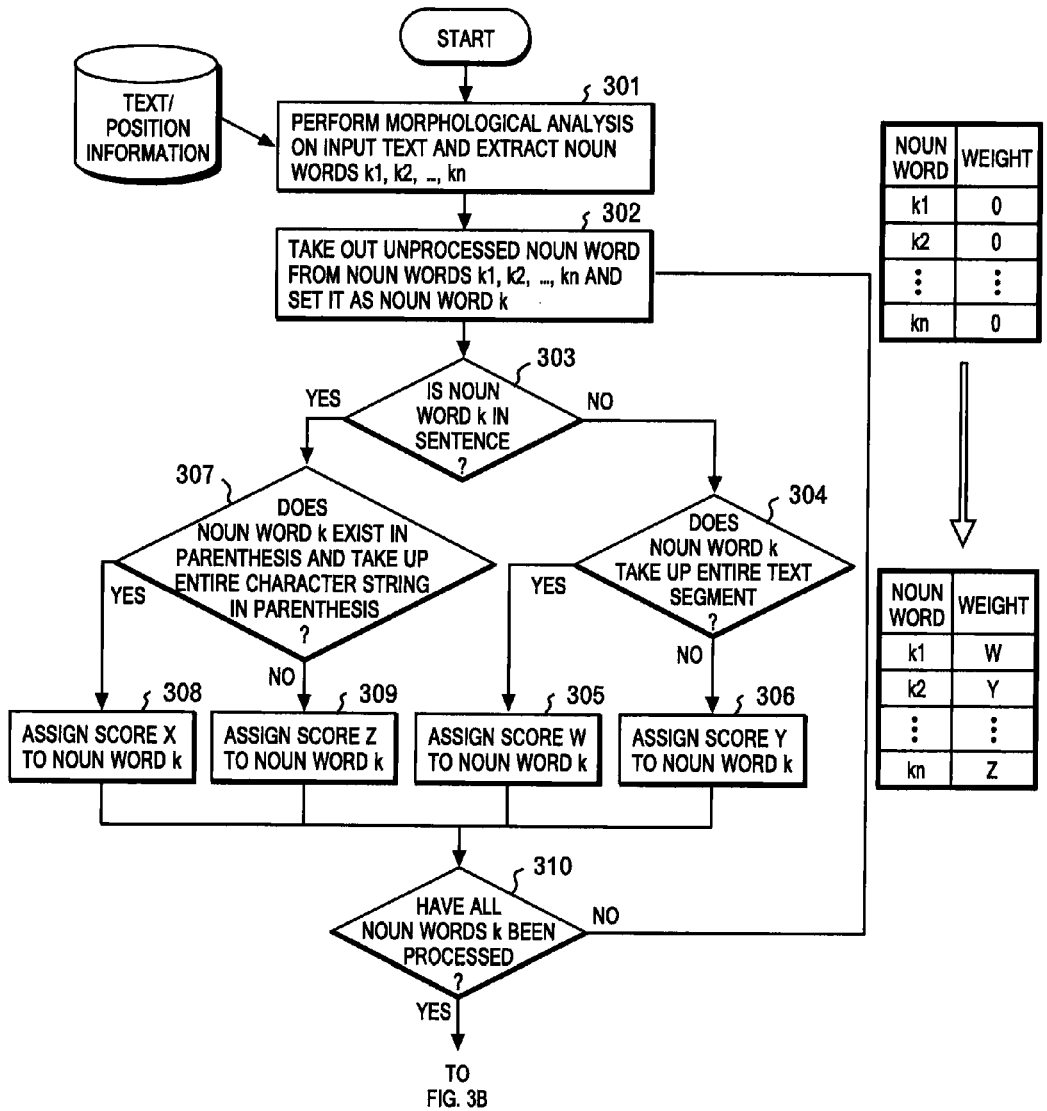
FIG. 3A shows a flowchart showing an extraction of a seed expression, according to the embodiment of the present invention.

In FIG. 3A described below, the document structure information is used, for example, in determining whether a noun word of step 304 takes up an entire text segment.

The language superficial information is raw text information which appears in document data and is text information not subjected to processing of, for example, substituting with a normal form. The raw text information is information which can be understood by the type of characters or the like without performing a morphological analysis, and is the form of its appearance in the case of a word, for example. For example, "1" is a number, "a" is a hiragana, and "■" is a symbol.

Figure 3B:
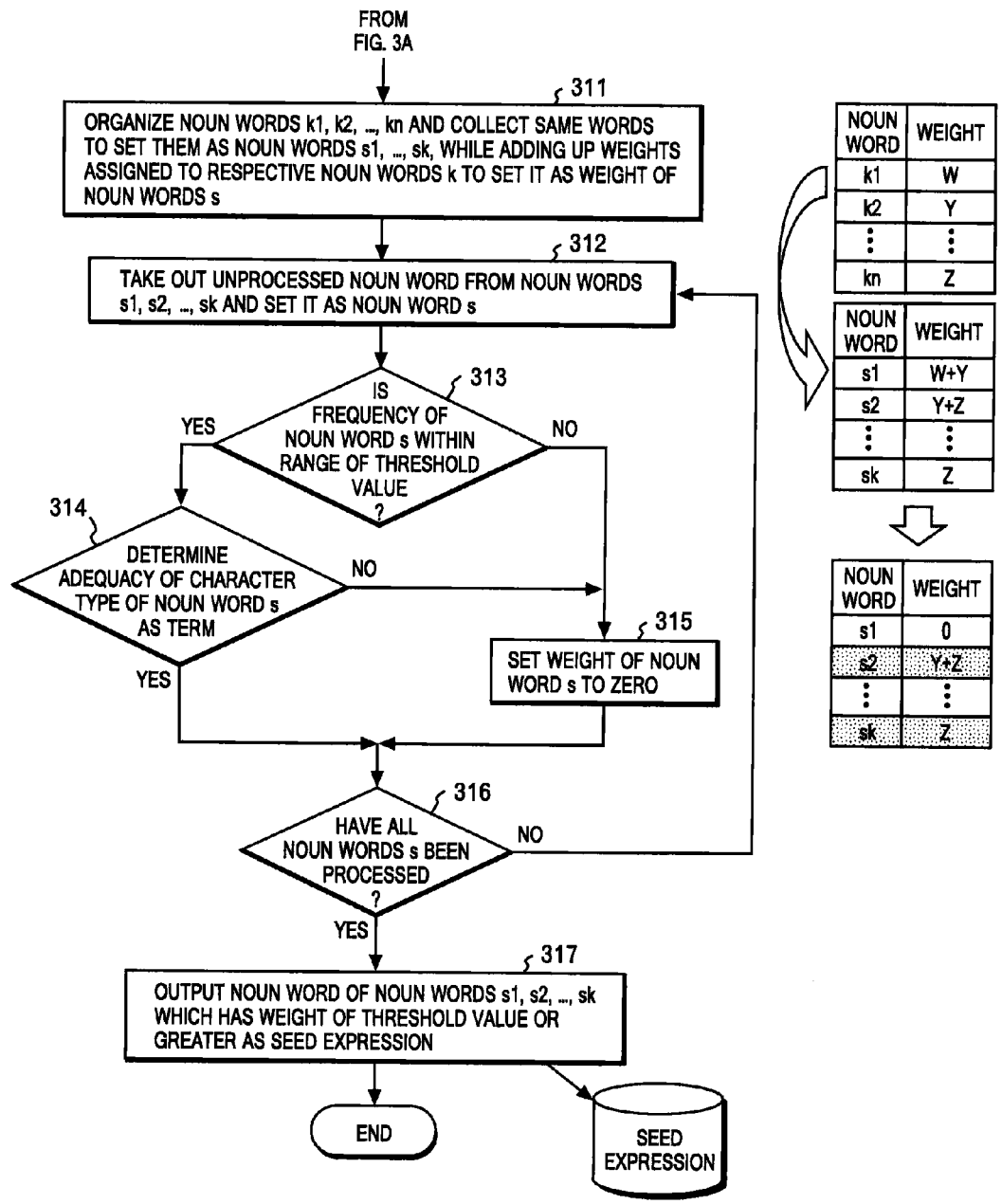
FIG. 3B shows a flowchart showing the extraction of the seed expression, according to the embodiment of the present invention.

In FIG. 3B described below, the language superficial information is used, for example, in determining whether a noun word of step 307 is in a parenthesis and in determining the adequacy of a character type of step 314 as a term.

The language part-of-speech information is information obtained only after division into morphemes is performed by the morphological analysis and processing of assigning a part of speech with respect to the morpheme is further performed.

In FIG. 3A described below, the language part-of-speech information is used in extracting noun words of step 301. The morphological analysis information is information obtained by the morphological analysis. The morphological analysis is a technique of dividing a sentence written in a natural language into morphemes of minimum units with meaning in the language.

In FIG. 3A described below, the language part-of-speech information is used, for example, in extracting the noun words of step 301 and determining whether the noun word of step 303 is in a sentence in the document data.

In the embodiments of the present invention, "second text processing information," "third text processing information," and "fourth text processing information" are particular word modification information. The word modification information is information on whether or not a natural sentence satisfies a predetermined grammar requirement. Note that, as the "second text processing information," the "third text processing information," and the "fourth text processing information," any one of the document structure information, the language superficial information, the language part-of-speech information, and the morphological analysis information can be used.

Figure 4A:
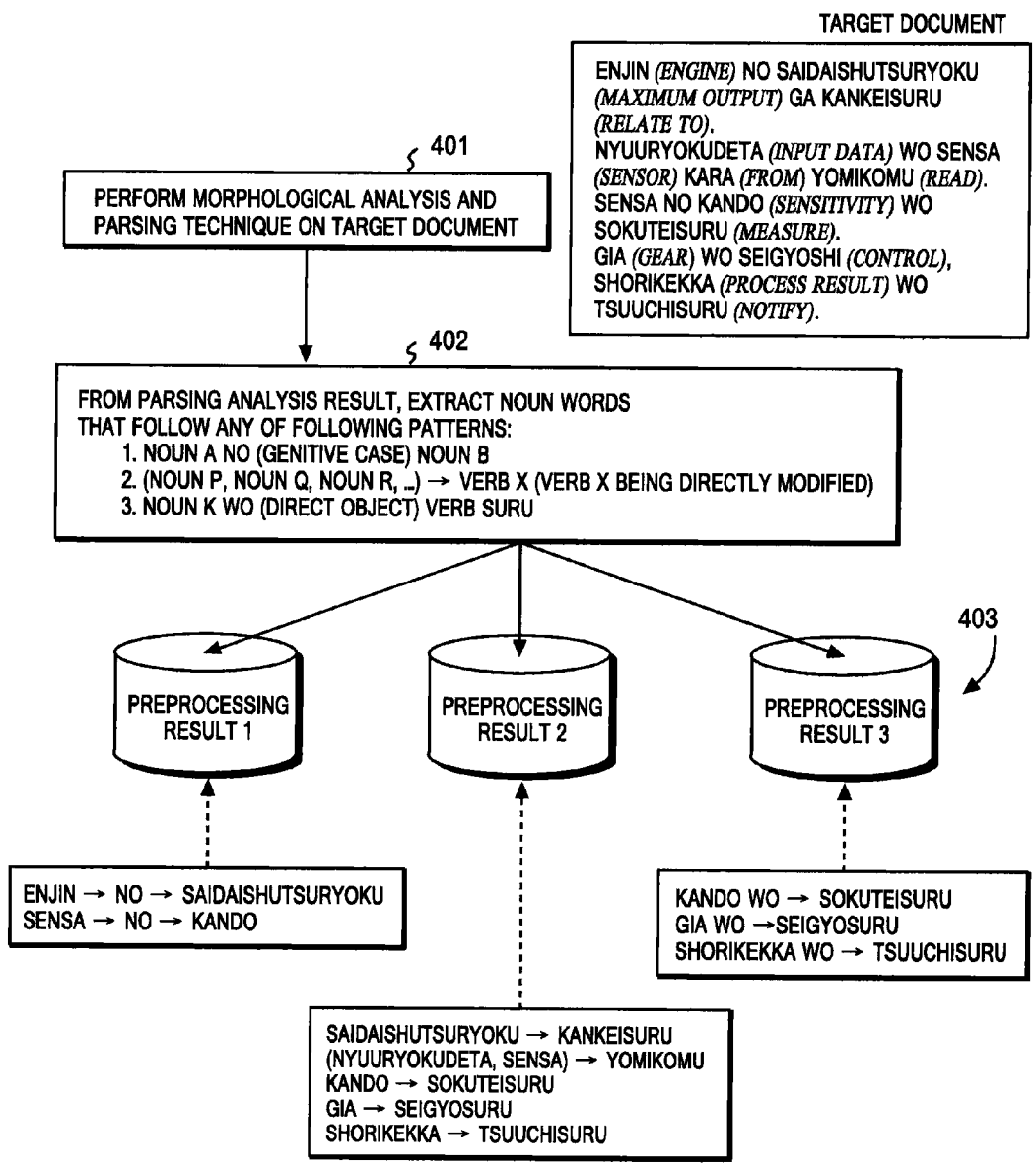
FIG. 4A shows text processing information used at the time of term candidate extraction and weight assignment, according to the embodiment of the present invention.

The word modification information is, for example, the following shown in FIG. 4A:
(1) A noun word modifying a genitive case word, or a noun word modifying a noun word in genitive case: (Example: Noun A no (genitive case) Noun B).
(2) A noun word directly modifying a verb word, or modifying a noun word as an object of a verb word: (Example: (Noun P, Noun Q, Noun R, . . . )→Verb X (Verb X being directly modified)).
(3) A noun as a direct object modifying a verb word, or a noun word modifying a noun word as a direct object of a verb word: (Example: Noun k wo (direct object) Verb suru.)

In the embodiments of the present invention, the "second text processing information" is used in a step of extracting term candidates in relation to the extracted noun words.

Figure 5A:
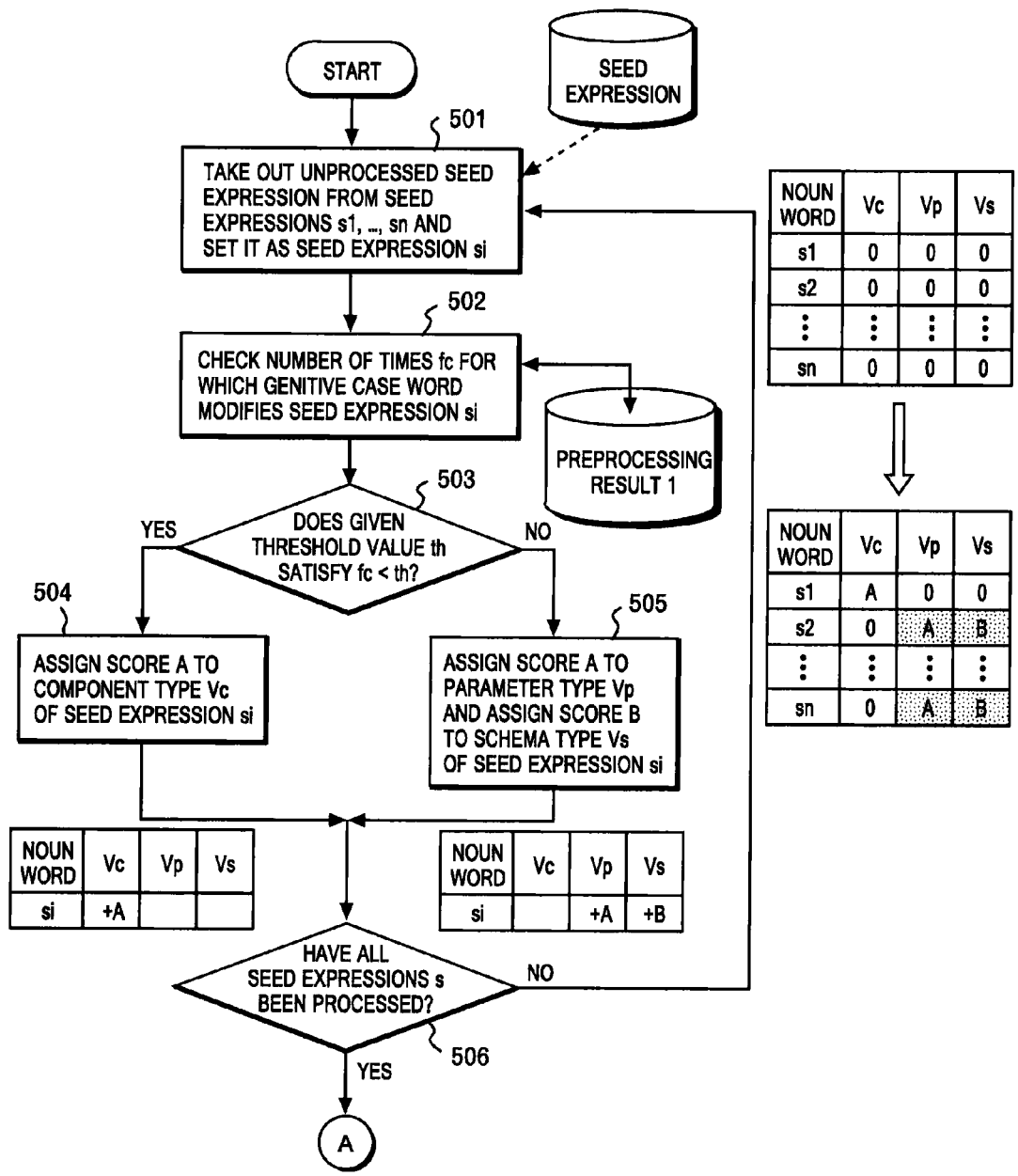
FIG. 5A shows an example of assigning weight to the seed expression, according to the embodiment of the present invention.
Figure 5B:
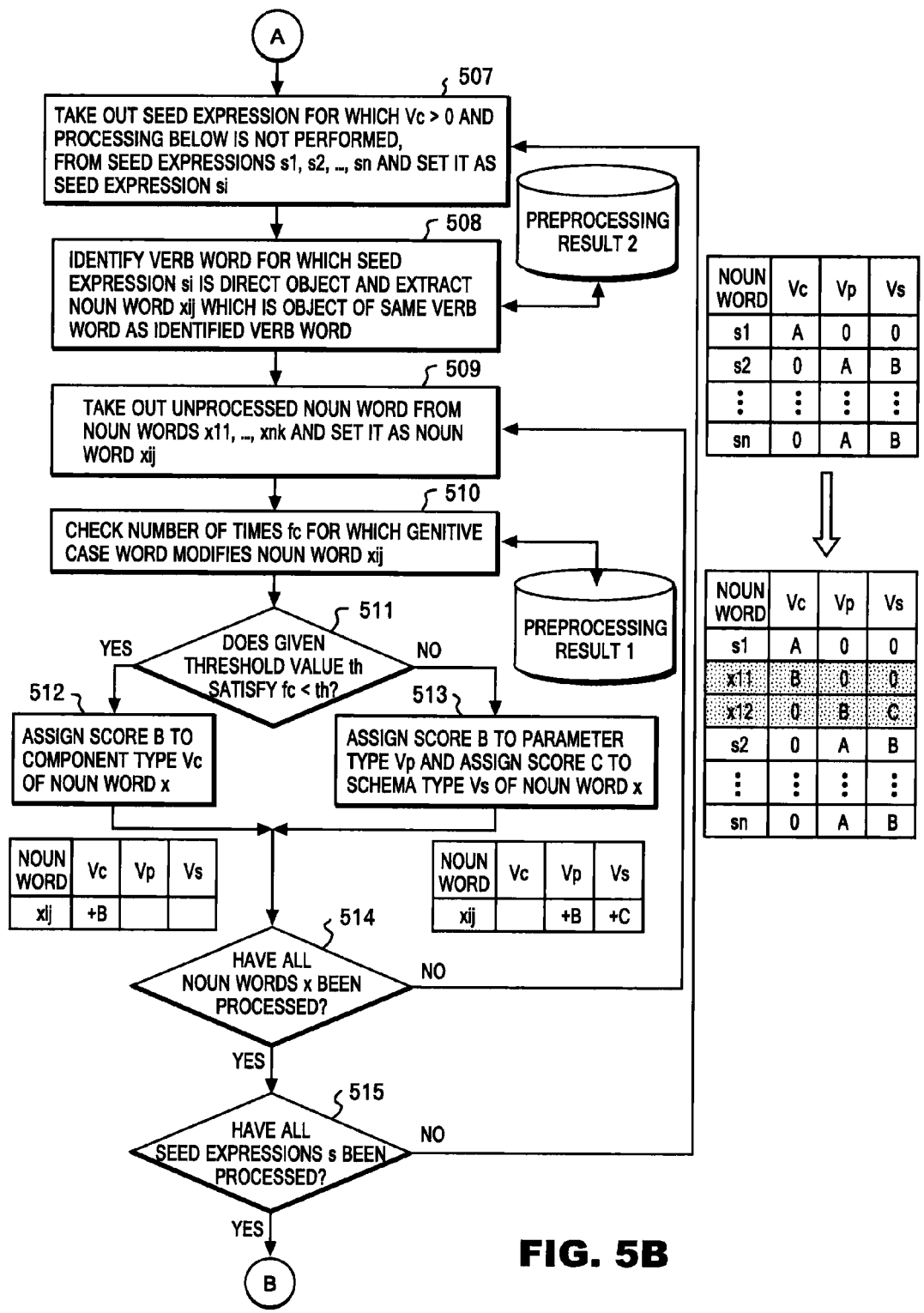
FIG. 5B shows the example of extracting the term candidate and assigning weight to the term candidate, according to the embodiment of the present invention.

In FIG. 5B described below, the second text processing information is used in identifying a verb word for which the noun word is a direct object and extracting a noun word as an object of the same verb word as the identified verb word. Note that, in the identification of a verb word for which a noun word is a direct object, the language part-of-speech information and the morphological analysis information are used.

In the embodiments of the present invention, the "third text processing information" and the "fourth text processing information" are used in selecting which type out of multiple types is to be assigned weight in order to determine which noun word type of the multiple types the extracted noun words and the term candidates each belong to.

In FIG. 5A described below, the third and fourth text processing information are used for checking the number of times a genitive case word modifies a seed expression si.

In FIG. 5B described below, the third and fourth text processing information are used for checking the number of times a genitive case word modifies a term candidate xij.

Figure 5C:
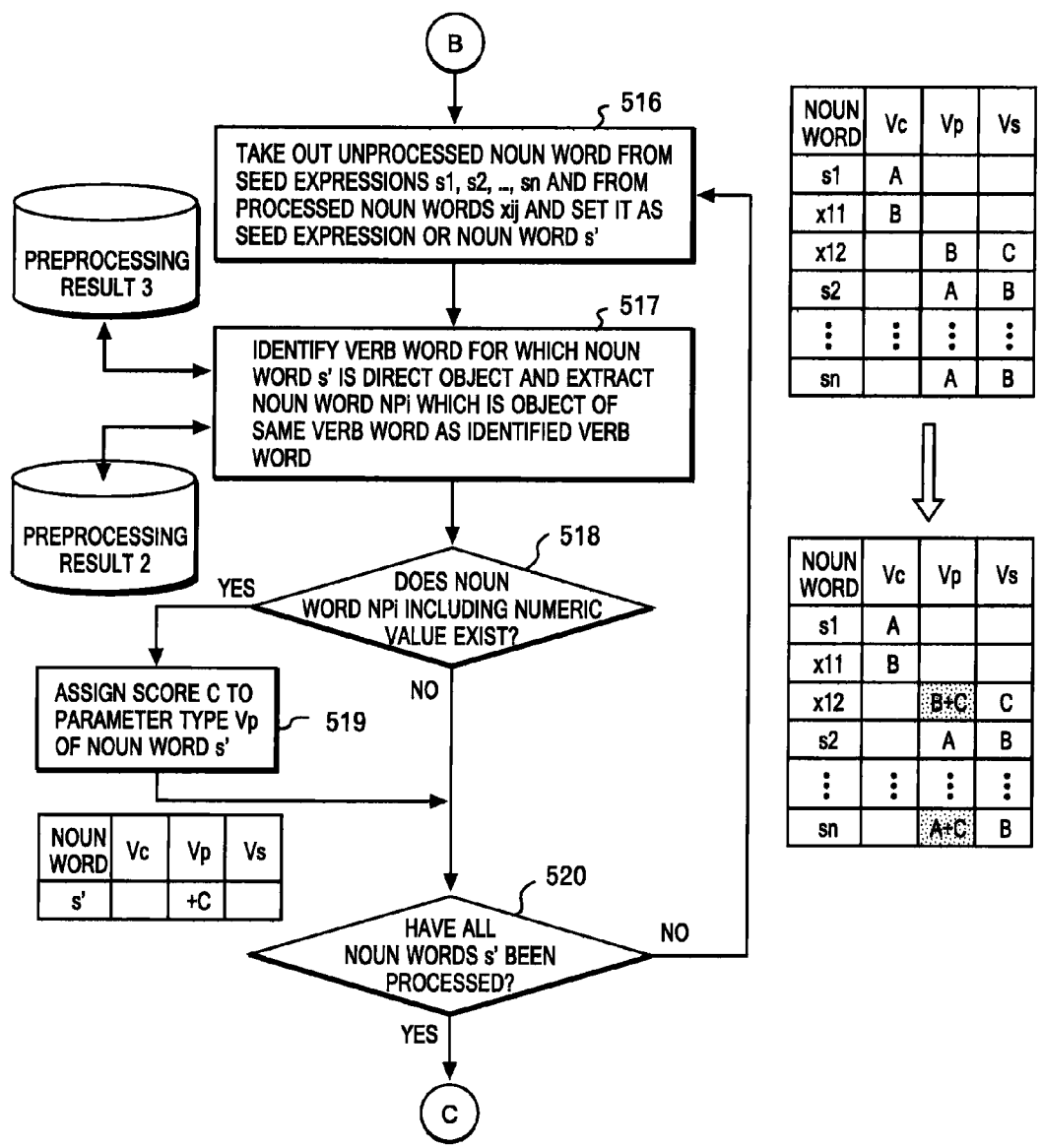
FIG. 5C shows the example of assigning weight to the seed expression and the term candidate, according to the embodiment of the present invention.

In FIG. 5C described below, the third and fourth text processing information are used for identifying a verb word for which a noun word s' is a direct object and extracting a noun word NPi as an object of the same verb word as the identified verb word.

Figure 5D:
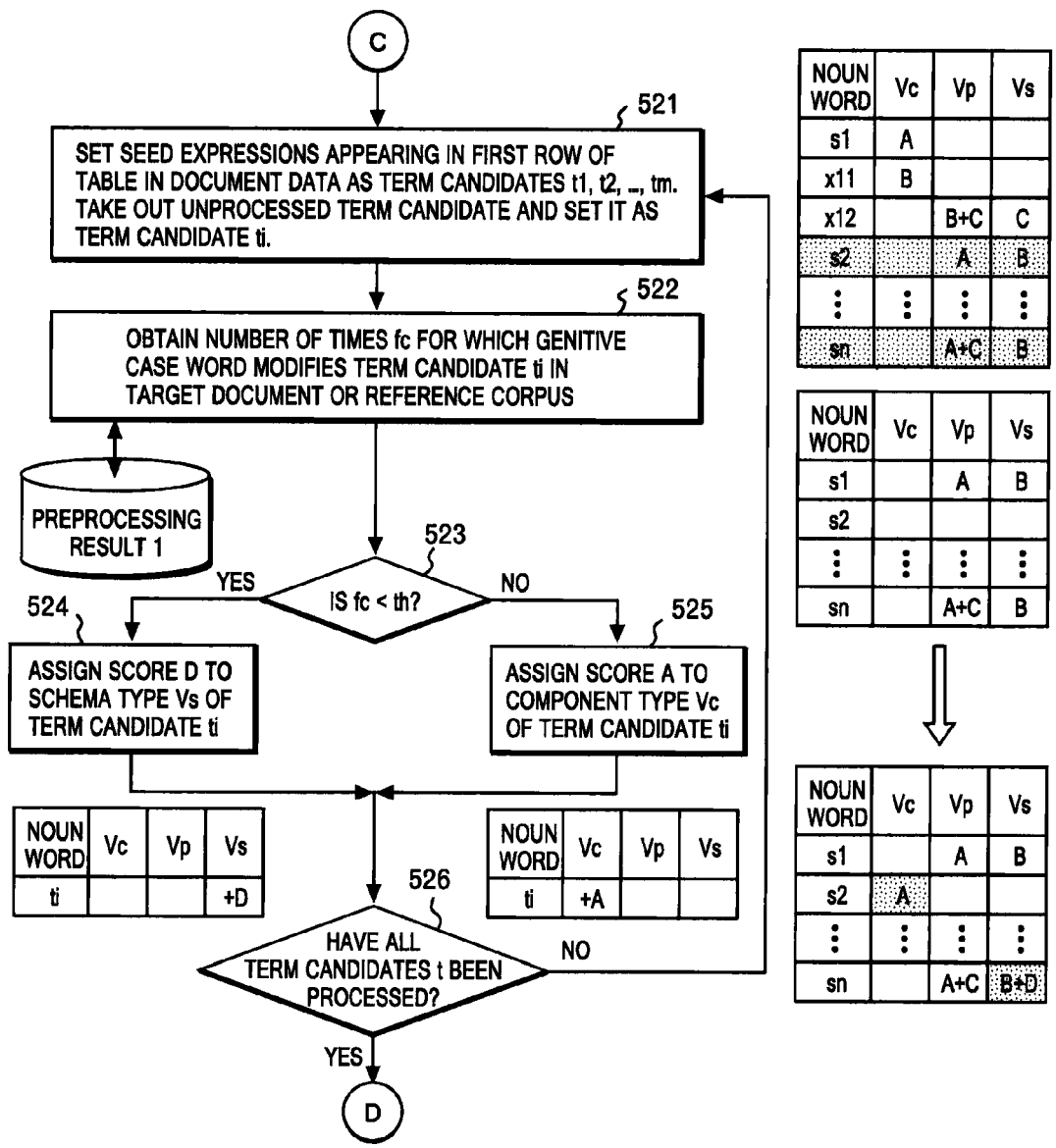
FIG. 5D shows the example of assigning weight to the seed expression and the term candidate, according to the embodiment of the present invention.

In FIG. 5D described below, the third and fourth text processing information are used for obtaining the number of times a genitive case word in the target document or the reference corpus modifies a term candidate ti of a seed expression which appears in a first row of a table in the document data.

Figure 5E:
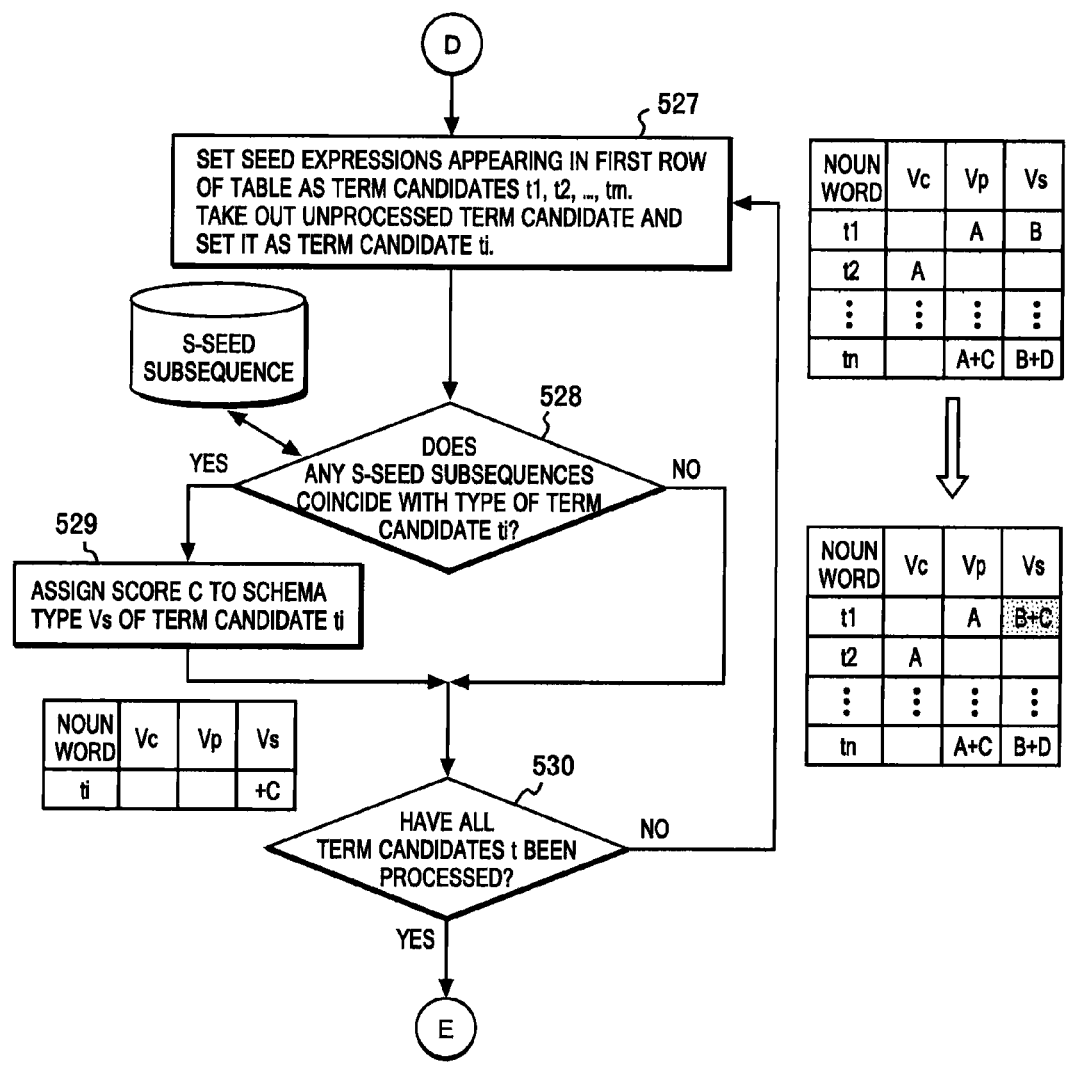
FIG. 5E shows an example of assigning weight to the seed expression and the term candidate, according to the embodiment of the present invention.

In FIG. 5E described below, the third and fourth text processing information are used for determining the coincidence with the type of the term candidate ti for all of s-seed subsequences.

In the embodiments of the present invention, "multiple types" include, but are not limited to, a component type (Vc), a parameter type (Vp), and a schema type (Vs). A type not classified as such can also be provided separately. A type having a different name can also be provided.

The component type (Vc) represents the level of a term belonging to a component. The component is a term representing, for example, a module (component) name or a function name. The parameter type (Vp) represents the level of a term representing a parameter. The parameter is a term representing, for example, an attribute name, a data name, or a parameter name, and is an attribute which only specific components have. The schema type (Vs) represents the level of a term representing a schema. The schema is a term which can become a schema of a database, and is an attribute which all of the components have.

In the embodiments of the present invention, "which noun word type of the multiple types the noun word and term candidate each belong to" is featured by weights representing probabilities of the noun words and term candidates for the respective types. The weight is assigned using the third text processing information and the fourth text processing information. For example, focusing on a language expression representing possession such as "●● no xx," the weights are assigned on the assumption that ●● is likely the component type and xx is likely the parameter type.

In the embodiments of the present invention, "to determine which noun word type of the multiple types the noun word and term candidate each belong to" means, for example, to determine which type of the three types the noun word and term candidate each belong to in the case where the multiple types are the component type, the parameter type, and the schema type.

A computer-implemented method, according to an embodiment of the present invention, of extracting a term from document data having a text segment mainly includes the following steps.

Step 1: A step of using the first text processing information to extract an expression which is definitely displayed as a noun word, i.e., an extraction result, from the document data (such an expression is also called seed expression).

The first text processing information includes, as described above, any one of: the document structure information, the language superficial information, the language part-of-speech information, and the morphological analysis information. In Step 1, a definite expression as a noun word, which is a seed expression, needs to be obtained. Being a more reliable piece of information, the first text processing information is useful in this step.

Unlike the term candidate described below, the seed expression is a noun word to be displayed as a final extraction result. In this sense, the seed expression is a "definite expression."

Step 2: A step of using the second text processing information to extract a new term candidate in relation to the extracted noun word.

The second text processing information includes the word modification information, as described above. As information about moderate conditions, the second text processing information is useful in this step for extending the seed expression.

Step 3: A step of, in order to determine which noun word type of multiple types the extracted noun word and term candidate each belong to, using the third text processing information to select at least one type out of the multiple types to be assigned weight, and assigning the weight to types selected for seed expression and term candidate, respectively. Further, a step can be implemented using the fourth text processing information to optionally repeat the selection and the assignment of weight for multiple times.

The third text processing information and the fourth text processing information include the word modification information, as described above. Being information of moderate conditions, the third text processing information and the fourth text processing information are useful in determining which noun word type of the multiple types the noun word and term candidate each belong to.

Step 4: A step of determining the type to which the extracted noun word and term candidate belong, based on the assigned weights. Particularly, a step of comparing the respective weights of the multiple types and determining that the extracted noun word and the extracted term candidate are noun words that belong to types assigned the highest weights, respectively.

By the determination, the noun word types into which the extracted noun word and term candidate are classified are determined.

Step 5: A step of outputting the extracted noun word and term candidate in association with their respective determined types.

Hereinafter, the embodiments of the present invention will be described according to the drawings. It should be understood that this embodiment is for illustrating a preferred aspect of the present invention, and is not intended to limit the scope of the present invention to what is shown herein. Throughout the drawings, the same reference numerals denote the same objects, unless otherwise stated.

FIG. 1A shows information included in a technical document, e.g., a requirement document and specification document of a system. The analysis is performed mainly in order to understand the contents of the document. A requirement document or specification document (101) typically describes information regarding demeanor (102), structure (103), required quality (104), and restriction (105).

The demeanor (102) refers to an extracted state and shift of a target system described in the requirement document or specification document as well as extracted action in the state. The structure (103) refers to extracted structures or relation of components constituting the target system as well as extracted functions of the components. The required quality (104) refers to an extracted quality requirement which is not shown directly by numeric values. The restriction (105) refers an extracted specification or restrictive relation determined by numeric values, such as specification data or target performance.

FIG. 1B shows examples of a text segment of the embodiment of the present invention. The document data includes one or more text segments. The text segment is a structurally identifiable segment, and the following can be given as its examples.

A segment divided by a period (106): The document data can include one or more segments (106A to 106D) each divided by a period. The period is a very small circle in the Japanese language, for example. Other languages have different forms for the period.

A segment divided in a tag unit (107): The document data can include one or more segments (107A and 107B) divided in tag units. The tag can include, for example, a tag conforming to a description method of HTML and XML. The tag is normally shown by a parenthesis (< >), but is not limited thereto. The parenthesis is normally formed of a pair of a start tag (< >) and an end tag (</>) described thereafter.

A segment divided by a line break (108): The document data can include one or more segments (108A to 108C) divided by line breaks. The line break is normally not shown in the document data, but a computer system can recognize the line break by a line break code.

A segment divided by a paragraph (109): The document data can include one or more segments (109A and 109B) divided by paragraphs.

A segment formed of a cell of a table (110): The document data can include multiple cells (110A to 110N). In the embodiment of the present invention, the size of the cell has no influence on the extraction.

A headline segment (111): The document data can normally include one headline segment (111A) as a title of the document. The document data can include multiple headlines, e.g., multiple headline segments for respective chapters.

An in-drawing text segment (112): The in-drawing text segment is a text segment (112A and 112B) embedded in a drawing.

FIG. 1C shows an example of multiple types of a noun word of the embodiment of the present invention. In the embodiment of the present invention, the "multiple types" of a noun word are classifications of the noun word, based on the level of a term to be extracted from the document data.

As shown in FIG. 1C, terms used in a technical document can be classified into three types. Types of information to be extracted are fixed in a technical document. Accordingly, the preparation of three types makes it possible to extract all information necessary for understanding the contents described in the document. The classification can be changed depending on the language or the target document. Further, change of the classification names and more detailed classification can be performed depending on the purpose.

Component: The component is a term representing, for example, a module (component) name or a function name. Examples of the component are noun words, "power supply button" and "speed adjustment function."

Parameter: The parameter is a term representing, for example, an attribute name, a data name, or a parameter name, and is an attribute which only specific components have. Examples of the parameter are noun words, "maximum output number" and "minimum speed."

Schema: The schema is a term which can become a schema of a database, and is an attribute which all of the components have. The schema is, for example, a column title of a table column. Examples of the schema are noun words, "function," "component," "input," and "output."

Figure 2:
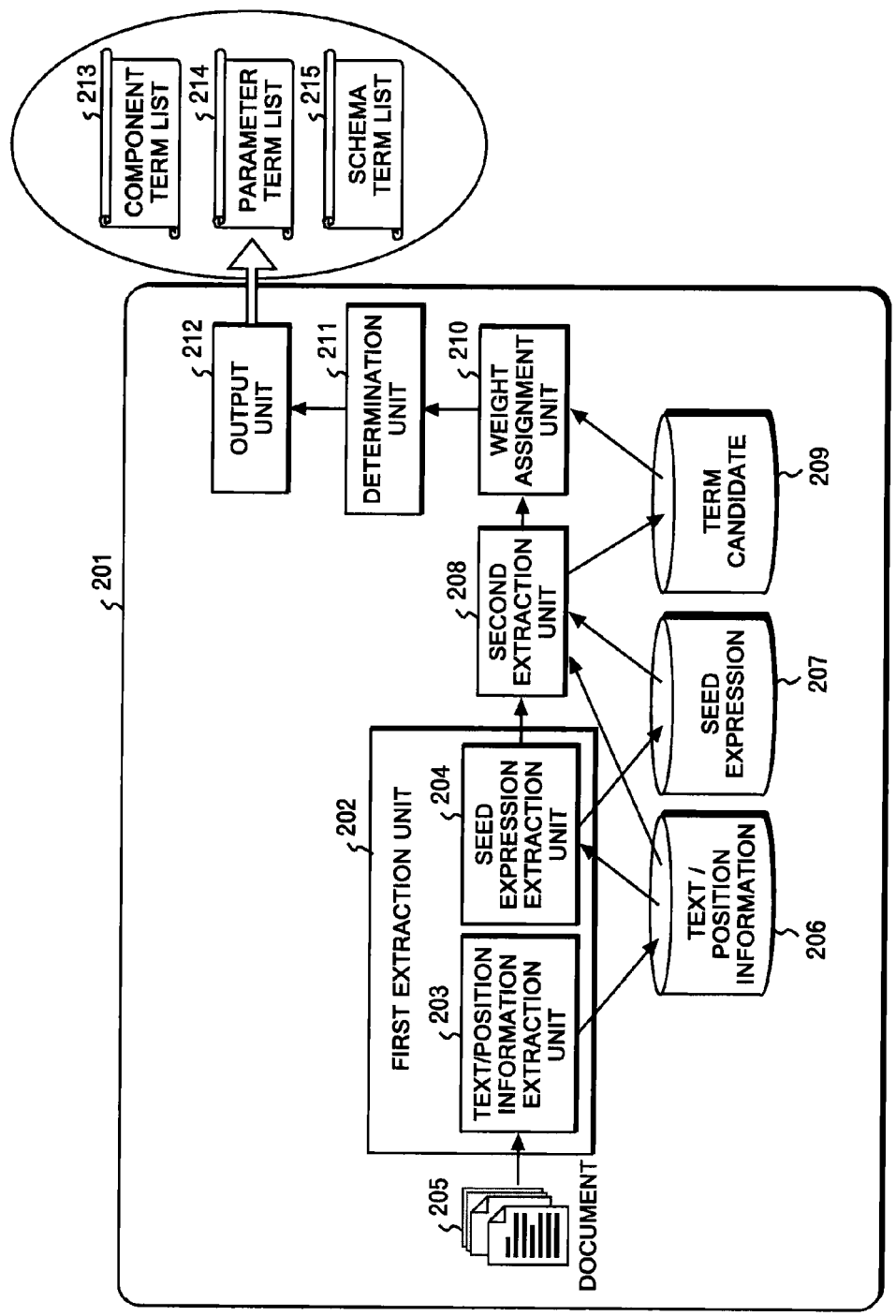
FIG. 2 shows a block diagram of a computer system of the embodiment of the present invention.

FIG. 2 shows a block diagram of a computer system of the embodiment of the present invention. A computer system (201) includes a first extraction unit (202), a second extraction unit (208), a weight assignment unit (210), a determination unit (211), and an output unit (212).

The first extraction unit (202) includes a text/position information extraction unit (203) and a seed expression extraction unit (204). The text/position information extraction unit (203) obtains a text and its positional information in document data (205) by using a document analysis technique. The text/position information extraction unit (203) also stores data of the respective extracted text and positional information in a storage medium, e.g., a database (206).

The document analysis technique is a technique provided by, for example, OpenOffice. The text and its positional information can be obtained using the technique. The text is obtained by, for example, performing the morphological analysis on the text. The morphological analysis technique is provided by, for example, ChaSen. Noun words are extracted using the technique. For example, the following result is obtained by performing the morphological analysis on a sentence "Komponento (component) ga shingo (signal) wo antena (antenna) yori (from) okutta (sent)."

konponento: noun
ga: particle
shingo: noun
wo: particle
antena: noun
yori: particle
okutta: verb, normal form: okuru (send)

The positional information can be obtained using XPath when, for example, the document data is described in XML format. If the document data is created by word processor software, paragraph numbers are the positional information. An example of the positional information in document data is "paragraph (13)." If the document data is created by spreadsheet software, the positional information is coordinates of a cell or the coordinates of the cell as well as a sheet name. An example of the positional information in this case is "sheet (1), cell (3,5)." If the document data is created by presentation sheet software, the positional information can be position coordinates on a sheet. An example of the positional information in this case is "45,22."

When the document data is described in XML format, the computer system can obtain the positional information by directly analyzing the document data. When the document data is not in XML format, the computer system can cause an application which has created the document data to provide the positional information. The computer system can obtain the positional information by, for example, using an API (macro language) for operating the document data, which is provided by the application.

The seed expression extraction unit (204) reads text data from the storage medium (206) and extracts a noun word in the text data by using the morphological analysis technique. The seed expression extraction unit (204) also extracts a seed expression based on the positional information or an appearance frequency of the extracted noun word.

In one embodiment of the present invention, the seed expression extraction unit (204) employs, for example, a noun word taking up an entire text segment as the seed expression. This is based on an observation that a noun word described alone in a text segment in, for example, a technical document is likely a noun word with a feature in the technical document. The employed seed expression is stored in a storage medium, e.g., a database (207). Note that the storage media (206 and 207) can be the same storage medium.

Note that conventional methods of term extraction use correct data selected by hand as the seed expression. In contrast, in the present invention, the computer system (201) automatically selects the seed expression.

The second extraction unit (208) uses the text processing information to extract a term candidate in relation to the seed expression (207) from the document data (205) or from a corpus (not shown) including text data described in the same language used in the document data. This is because a sufficient number of terms may not be able to be collected with the seed expressions (207) alone. The extracted term candidate is stored in a storage medium, e.g., a database (209). Note that the storage media (206, 207, and 209) can be the same storage medium.

In order to determine which type of multiple noun word types the seed expression (207) and the term candidate (209) each belong to, the weight assignment unit (210) uses the text processing information to determine which type of the multiple types is to be assigned weight, and then assigns the weight to the selected type for each of the seed expression (207) and the term candidate (209). In this example, the multiple types are the component type (Vc), the parameter type (Vp), and the schema type (Vs).

The determination unit (211) compares the weights of the multiple types for each of the seed expression (207) and the term candidate (209), and determines that the seed expression (207) and the term candidate (209) respectively are noun words that belong to the types assigned with the highest weights.

The output unit (212) outputs the seed expression (207) and the term candidate (209) onto a display device in accordance with the determination of the determination unit (211). Here, the output unit (212) can display the seed expression (207) and the term candidate (209) on the display device in association with the respective determined types.

"To display in association with the type" includes displaying the seed expression (207) and the term candidate (209) on the display device by using different formats for the respective determined types. Alternatively, "to display in association with the type" includes, as in the example of FIG. 2B, outputting the seed expression (207) and the term candidate (209) onto the display device by associating each of them with a component term list (213), a parameter term list (214), or a schema term list (215) under titles named component, parameter, and schema, respectively.

FIGS. 3A to 3B are flowcharts showing the extraction of the seed expression, according to the embodiment of the present invention. Before the flowchart begins, the computer system (201) extracts a text and its positional information in the document data by using the text/position information extraction unit (203), and stores the extracted information in the storage medium (206).

Of the steps of extracting the seed expression according to the embodiment of the present invention, FIG. 3A shows steps of assigning weight to the respective noun words based on the position and proportion of the noun words in the document data. The computer system (201) executes the following steps by using the seed expression extraction unit (204). In step 301, the computer system (201) reads data of the text and its positional information extracted from the target document data (205) from the storage medium (206) and inputs the data to the seed expression extraction unit (204). The computer system (201) performs the morphological analysis and parsing on the input text, and extracts one or more noun words from the text by using the language part-of-speech information and the morphological analysis information. The extracted noun words are shown as noun words k1, k2, . . . , and kn. The computer system (201) sets the weights of the respective noun words to zero. Note that, if not a single noun word is extracted, the step of extracting the seed expression ends with step 301.

In step 302, the computer system (201) takes out an unprocessed noun word out of the noun words k1, k2, . . . , and kn as a noun word k, and repeats this operation until processing of step 303 described below is finished for all of the respective noun words ki (i=1, 2, . . . , n).

In step 303, the computer system (201) uses the language part-of-speech information to check whether the noun word k is in a sentence in the document data (205). A sentence preferably includes a subject and a predicate, but the subject can be omitted. If the noun word k is in a sentence, the processing proceeds to step 307. If the noun word k is not in a sentence, the processing proceeds to step 304.

In step 304, the computer system (201) uses the document structure information to check whether the noun word k takes up an entire text segment. If the noun word k takes up the entire text segment, the processing proceeds to step 305. If the noun word k does not take up the entire text segment, the processing proceeds to step 306.

In step 305, the computer system (201) assigns a score W to the noun word k. In the example of FIG. 3A, the score W is assigned to the noun word k1.

In step 306, the computer system (201) assigns a score Y to the noun word k. In the example of FIG. 3A, the score Y is assigned to the noun word k2.

In step 307, the computer system (201) uses the language part-of-speech information to check whether the noun word k is in a parenthesis and takes up an entire character string in the parenthesis. If the noun word k is in a parenthesis and takes up an entire character string in the parenthesis, the processing proceeds to step 308. If the noun word k is not in a parenthesis or does not take up an entire character string in the parenthesis, the processing proceeds to step 309.

In step 308, the computer system (201) assigns a score X to the noun word k.

In step 309, the computer system (201) assigns a score Z to the noun word k. In the example of FIG. 3A, the score Z is assigned to the noun word kn.

In step 310, the computer system (201) proceeds to step 311 of FIG. 3B if the processing is finished for all of the respective noun words ki (i=1, 2, ..., n). If the processing is not finished for all of the respective noun words ki (i=1, 2, ..., n), the computer system (201) returns to step 302.

The magnitude relations among the scores W, X, Y, and Z are as follows; W>X>Y>Z. The score W is assigned when the noun word k does not exist in a sentence and takes up an entire text segment. The score X is assigned when the noun word k exists in a sentence, is in a parenthesis, and takes up an entire character string.

The score Y is assigned when the noun word k does not exist in a sentence and does not take up an entire text segment. The score Z is assigned when the noun word k exists in a sentence, and is not in a parenthesis or does not take up an entire character string.

Of the steps of extracting the seed expression according to the embodiment of the present invention, FIG. 3B shows steps of extracting the seed expression based on the positional information and appearance frequency of the extracted noun word.

In step 311, the computer system (201) organizes the noun words k1, k2, ..., kn and collects the same noun words and sets them as noun words si (i=1, 2, 3, ..., k) (n≥k). When the same noun words are collected to obtain a noun word s, the weights assigned to the respective noun words ki are added up to set the added weight as the weight of the noun word s. In the example of FIG. 3B, the weight of the noun word s1 is a weight (W+Y) which is a total of weights of a noun word having a weight W and a noun word having a weight Y. In a similar manner, the weight of the noun word s2 is a weight (Y+Z) which is a total of weights of a noun word having a weight Y and a noun word having a weight Z. Note that the weight of the noun word sk stays at the weight Z since there is no other noun word which is the same as the noun word sk.

In step 312, the computer system (201) takes out an unprocessed noun word out of the noun words s1, s2, ..., sk as the noun word s, and repeats this operation until processing of step 313 described below is finished for all of the respective noun words si (i=1, 2, ..., n).

In step 313, the computer system (201) obtains the frequency of the respective noun words si (i=1, 2, ..., k) appearing in the document data, i.e., the number of the respective noun words si in the document data. The computer system (201) determines whether the appearance frequency of each of the noun words si (i=1, 2, ..., k) is with a predetermined range. If the appearance frequency is within the predetermined range, the processing proceeds to step 314. If the appearance frequency is not within a predetermined range, the processing proceeds to step 315. The predetermined range is, for example, [1, (maximum frequency of noun word s)×0.8]. The reason for this setting is to exclude words which appear too frequently as general words. A general word is a word which does not need to be extracted so much as a technical term. The predetermined range starts from 1 so as to pick up words which "appear at least once." If the user determines to exclude words appearing at a frequency of once, the predetermined rage can be [2, xxx].

In step 314, the computer system (201) uses the language superficial information to determine the adequacy of the character type of the noun word s as a term. If the character type of the noun word s is determined to be adequate, the processing proceeds to step 316. If not, the processing proceeds to step 315. For example, such adequacy determination is performed as follows. The character type of the noun word s is determining as not adequate as a term when the character type of the noun word s is only one of number, symbol, or hiragana, or a combination of only the number and the symbol.

Examples of the character type being only the number, symbol, or hiragana are as follows: "120,"■"N," and "non-onono." An example of the character type of the noun word s being a combination of the number and symbol is as follows. For example, when a reference is cited in the document data, expression such as "In [1], ..." is used in the document data. In this case, [1] is a character string of only the number and symbol, but is used as a nominal.

If the "only" condition described above applies, there is a possibility of a morphological analysis error. That is, a numeric value or symbol can be detected as a noun word due to an error of the morphological analysis.

Step 314 is intended to remove such cases where the "only" condition applies.

In step 315, the weight of the noun word s is set to zero. Accordingly, noun words not in the predetermined range and noun words not adequate as terms are excluded.

In step 316, the computer system (201) proceeds to step 317 if the processing is finished for all of the respective noun words ki (i=1, 2, ..., n). If the processing is not finished for all of the respective noun words si (i=1, 2, ..., k), the computer system (201) returns to step 312.

In step 317, the computer system (201) outputs the noun word k having a weight of a predetermined threshold value or greater as the seed expression out of the respective noun words ki (i=1, 2, ..., n). The predetermined threshold value can differ depending on the target document data, language, or the like. The threshold value is, for example, (maximum weight of noun word s)×0.5. The noun words s having the threshold value or greater are shown as seed expressions (s1, s2, ..., sn). The threshold value can change depending on the target document data or language. The computer system (201) stores the output noun word k as the seed expression in the storage unit (207).

FIG. 4A shows the text processing information used when extracting the term candidate and assigning weight, according to the embodiment of the present invention. The text processing information is prepared before the term candidate extraction, or before the weight assignment.

In step 401, the computer system (201) performs the morphological analysis and parsing on the target document data (205). Assume that the content of the target document data is as follows:

Enjin (engine) no saidaishutsuryoku (maximum output) ga kankeisuru (relate to).
Nyuuryokudeta (input data) wo sensa (sensor) kara (from) yomikomu (read).
Sensa no kando (sensitivity) wo sokuteisuru (measure).
Gia (gear) wo seigyoshi (control), shorikekka (processing result) wo tsuuchisuru (notify).

The computer system (201) obtains text data by performing the morphological analysis on the target document data. Then, the computer system (201) performs the parsing on the text data.

In step 402, the computer system (201) extracts expressions each of which follows any of the following patterns 1 to 3 from the text data:

(1) A noun word modifying a genitive case word, or a noun word modifying a noun word in genitive case: Noun A no (genitive case) Noun B (2) A noun word directly modifying a verb word, or a noun word modifying a noun word as an object of a verb word: (Noun P, Noun Q, Noun R, and the like)→Verb X (Verb X being directly modified)

(3) A noun as a direct object modifying a verb word, or a noun word modifying a noun word as a direct object of a verb word: Noun k wo (direct object) Verb sum (do).

Figure 4B:
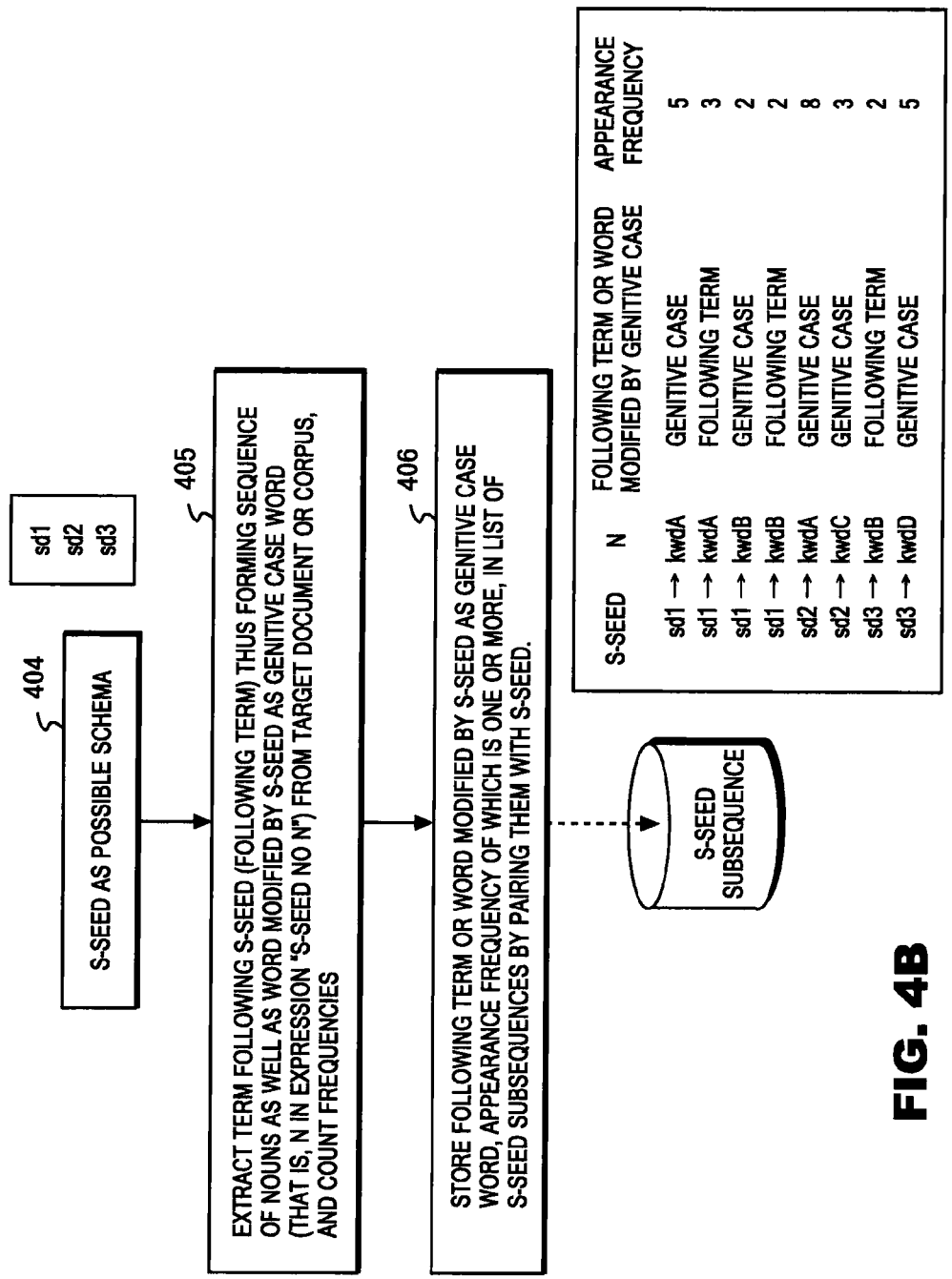
FIG. 4B shows a creation of a list of s-seed subsequences used at the time of the weight assignment, according to the embodiment of the present invention.

As a result, the following results are obtained.
Preprocessing result 1 (which follows pattern 1)
enjin→no→saidaishutsuryoku
sensa→no→kando
Preprocessing result 2 (which follows pattern 2)
saidaishutsuryoku→kankeisuru
(nyuuryokudeta, sensa)→yomikomu
kando→sokuteisuru
gia→seigyosuru
shorikekka→tsuuchisuru
Preprocessing result 3 (which follows pattern 3)
kando wo→sokuteisuru
gia wo→seigyosuru
shorikekka wo→tsuuchisuru In step 403, the computer system (201) stores the preprocessing results 1, 2, and 3 in a storage unit. FIG. 4B shows the creation of a list of s-seed subsequences used to assign the weights, according to the embodiment of the present invention. The list of s-seed subsequences is prepared before the term candidate extraction or before the weight assignment.

In step 404, in response to the user inputting the list of terms as possible schemas (hereinafter such terms are called s-seeds), the computer system (201) proceeds to step 405. Alternatively, the list of s-seeds is selected from the reference corpus, and the selected list of s-seeds is inputted to the computer system (201). The number of s-seeds is, for example, 1 to 5.

In the example of FIG. 4B, the s-seeds are s-seeds sd1, sd2, and sd3. In step 405, the computer system (201) extracts a term following the s-seed thus forming a sequence of noun words (such a term being called a following term) as well as a word (N) modified by the s-seed as a genitive case word, from all or a part of the target document data or the reference corpus, and counts their appearance frequencies. The word (N) modified by the s-seed as a genitive case word refers to the word N in an expression "shugo (s-seed) no N."

In step 406, the computer system (201) stores the following term or the word modified by the s-seed as a genitive case word, the appearance frequency of which is one or more, in the list of s-seed subsequences by pairing them respectively with the s-seed. The computer system (201) stores the s-seed subsequence in the storage unit.

In the example of FIG. 4B, the list shows, for the s-seeds sd1, sd2, and sd3, the words N, the types of the words N, and the appearance frequencies. The type of the word N is either the following term or the word modified by the s-seed as a genitive case.

A specific example of processing of FIG. 4B is as follows. Assume that the writing or the reference corpus includes phrases "kinou (function) risuto (list)" and "kinou no gaiyou (outline)." In response to "kinou" being inputted as the s-seed, the noun word "risuto" is added to the s-seed subsequence list since "risuto" is a word following the s-seed "kinou." In a similar manner, in response to "kinou" being inputted as the s-seed, the noun word "gaiyou" is added to the s-seed subsequence list since "gaiyou" is a word modified by the s-seed "kinou" as a genitive case.

FIGS. 5A to 5F show examples of using the text processing information to extract a term candidate in relation to a seed expression and to assign a weight to each seed expression and each term candidate, according to the embodiment of the present invention.

In the example, the weights to be assigned are the score A, the score B, the score C, and the score D. The values of the weights are provided to the computer system in advance. The magnitude relations among the weights are A>B>C>D.

FIG. 5A shows an example of assigning weight to the seed expression, according to the embodiment of the present invention. In step 501, the computer system (201) takes out an unprocessed seed expression s from the seed expressions s1, s2, ..., sn as the seed expression si (i=1, 2, ... ). The computer system (201) also sets the weights of the component type Vc, the parameter type Vp, and the schema type Vs of the respective seed expressions si to zero.

In step 502, the computer system (201) checks the number of times fc a genitive case word modifies the seed expression si in the target document data (205) or the reference corpus. The genitive case word modifying the seed expression si refers to an expression such as "○○ no si." In step 502, the preprocessing result 1 of FIG. 4A can be used.

In step 503, the computer system (201) determines whether a predetermined threshold value th satisfies fc<th. The threshold value is, for example, 10% of the entire appearance frequency of the seed expression si. That is, if the seed expression si appears 10 times in the entire document, th=1. The appearance frequency can be changed appropriately depending on the document type, language, or the like. In the case where fc<th, the processing proceeds to step 504. In the case where fc≥th, the processing proceeds to step 505.

In step 504, the computer system (201) assigns the score A to the component type Vc of the seed expression si. In the example of FIG. 5A, i=1.

In step 505, the computer system (201) assigns the score A to the parameter type Vp and the score B to the schema type Vs of the seed expression si (A>B). In the example of FIG. 5A, i=2 and i=n, respectively. A higher score is assigned to the parameter type Vp than to the schema type Vs because the determination with respect to the schema is performed in FIG. 5D described below and because the schema, which is a particular category such as a column tile of a table column, is more likely to appear than the parameter.

In step 506, the computer system (201) determines whether the processing of steps 501 to 505 have been performed on all of the seed expressions s. If the processing has been performed, the processing proceeds to step 507 of FIG. 5B. If not, the processing returns to step 501. Until the weight assignments are finished for all of the seed expressions si, the processing of steps 501 to 505 is repeated.

A specific example of the processing of FIG. 5A is as follows. Assume that the writing includes phrases "botan (button) A no iro (color)" and "botan B no iro." If the seed expressions are "botan A," "botan B," and "iro," the score A is assigned to each component type Vc of "botan A" and "botan B," while the score A is assigned to the parameter type Vp of "iro" and the score B is assigned to the schema type Vs of "iro."

FIG. 5B shows an example of extracting a term candidate and assigning a weight to the term candidate, according to the embodiment of the present invention.

In step 507, the computer system (201) extracts the seed expression Sn the component type Vc of which is Vc>0 as needed from the seed expressions s1, s2, . . . , sn. Here, the seed expression Sn on which the processing of steps 508 to 514 described below has not performed is extracted. The computer system (201) sets the seed expression Sn thus taken out as a seed expression Si.

In step 508, the computer system (201) uses a parsing technique to identify a verb word for which the seed expression Si is a direct object in the target document data (205), and exhaustively extracts a noun word xij which is an object of the same verb word as the verb word thus identified. The extracted noun word is the term candidate. Alternatively, the computer system (201) can extract the noun word xij appearing in the same one sentence as the seed expression Si. In some cases, a less accurate noun word is extracted by using such an alternative method, compared to the case of performing the extraction from the entire document data. However, the alternative method is more useful in terms of speed than extracting from the entire target document data since the noun word xij is in the same sentence as the seed expression Si. Further, there are also cases where extracting from the entire target document data provides lower accuracy than extracting from within the same sentence.

Step 508 will be described with an example. Assume that the seed expression Si is a noun word "AAA" and a sentence is "AAA ga B no CCC wo hasshinsuru (transmit)." In step 508, only "CCC" modifying "hasshinsuru," which "AAA" also modifies, is extracted from the sentence. Alternatively, both noun words "B" and "CCC" appearing in the sentence other than "AAA" can be extracted.

In step 508, the preprocessing result 2 of FIG. 4A can be used.

In step 509, the computer system (201) takes out an unprocessed noun word from the noun words x11, . . . , xnk as the noun word xij.

In step 510, the computer system (201) obtains the number of times fc a genitive case word modifies the noun word xij. In step 510, the preprocessing result 1 of FIG. 4A can be used.

In step 511, the computer system (201) determines whether the predetermined threshold value (th) satisfies fc<th. When fc<th, the processing proceeds to step 512. Otherwise, the processing proceeds to step 513.

In step 512, the computer system (201) assigns the score B to the component type Vc of the noun word x. In the example of FIG. 5B, ij=11.

In step 513, the computer system (201) assigns the score B to the parameter type Vp of the noun word x and the score C to the schema type Vs of the noun word x (B>C). In the example of FIG. 5B, ij=12. A higher score is assigned to the parameter type Vp than to the schema type Vs because the determination with respect to the schema is performed in FIG. 5D described below and because the schema, which is a particular category such as the column title of a table column, is more likely to appear than the parameter.

In step 514, the computer system (201) determines whether the processing of steps 509 to 513 has been performed on all of the noun words x. If the processing has been performed, the processing proceeds to step 515. If the processing has not been performed, the processing returns to step 509. Until the processing has been finished for all of the noun words xij, the processing of steps 509 to 513 is repeated.

In step 515, the computer system (201) determines whether the processing of steps 507 to 514 has been performed on all of the noun words s. If the processing has been performed, the processing proceeds to step 516 of FIG. 5C. If the processing has not been performed, the processing returns to step 507. Until the processing has been finished for all of the noun words sn, the processing of steps 507 to 514 is repeated.

A specific example of the processing of FIG. 5B is as follows. Assume that the writing includes phrases "botan A ga hikaru (glow)" and "dengenbotan (power button) ga hikaru." When the seed expression is "botan A," a verb word modified by "botan A" is "hikaru." Being the other noun word modifying the same verb word as the verb word "hikaru," "dengenbotan" is extracted as the term candidate. The processing shown in FIG. 5A is performed also on the extracted term candidate "dengenbotan."

FIG. 5C shows an example of assigning a weight to each seed expression and each term candidate, according to the embodiment of the present invention. In step 516, the computer system (201) takes out an unprocessed noun word from the seed expressions s1, s2, . . . , sn and the term candidates x11, . . . , xnk as a noun word s'.

In step 517, the computer system (201) identifies a verb word for which the noun word s' is a direct object in the document data (205), and extracts a noun word NPi which is an object of the same verb word as the verb word thus identified. In the identification of the verb word of step 517, the preprocessing result 3 of FIG. 4A can be used. In the extraction of the noun word NPi of step 517, the preprocessing result 2 of FIG. 4A can be used. The verb word for which the noun word s' is a direct object is, for example, "ΔΔ suru" of "s' wo ΔΔ suru." Alternatively, the computer system (201) can extract the noun word NPi immediately after the noun word s'. In the natural Japanese language, a case particle "wo" of a direct object is frequently used at a position close to a verb. For this reason, a noun immediately after a clause of the direct object frequently forms a noun phrase which is an object of the same verb word. Although some noun words may be missed, the alternative method is useful since noise is reduced correspondingly. An example of the case particle "wo" of a direct object being used frequently at a position close to a verb in the natural Japanese language is "watashi (I) ga konpyuta (computer) wo kau (buy)" being more frequently used than "konpyuta wo watashi ga kau."

In step 518, the computer system (201) determines whether the noun word NPi includes a number. When the noun word NPi includes a number, the processing proceeds to step 519. When the noun word NPi does not include a number, the processing proceeds to step 520.

In step 519, the computer system (201) assigns the score C to the component type Vc of the noun word s'. In the example of FIG. 5C, the noun words s' are the seed expression Sn and the term candidate x12.

In step 520, the computer system (201) determines whether the processing of steps 516 to 519 has been performed on all of the noun word s'. If the processing has been performed, the processing proceeds to step 521 of FIG. 5D. If the processing has not been performed, the processing returns to step 516.

Until the processing has been finished for all of the seed expression s1, s2, ..., sn and the term candidates x11, ..., xnk, the processing of steps 516 to 519 is repeated.

A specific example of the processing of FIG. 5C is as follows. Assume that the writing includes phrases "atai (value) A wo nyuuryokusuru (input)" and ""atai B wo nyuuryokusuru." When the seed expression or term candidate is "atai A," the verb word modifying "atai A" is "nyuuryokusuru." Thus, the other noun word "atai B" modifying the same verb word as the verb word "nyuuryokusuru" is collected. However, since "atai B" includes a number, the score C is assigned to the parameter type Vp of "atai A."

FIG. 5D shows an example of assigning a weight to each seed expression and term candidate, according to the embodiment of the present invention. In step 521, of the seed expressions, the computer system (201) sets seed expressions appearing in the first row of the table as noun words t1, t2, ..., tm. An unprocessed seed expression is taken out from the seed expressions and set as the noun word ti.

In step 522, the number of times fc a genitive case word modifies the noun word ti in the target document data (205) or the reference corpus is checked. A genitive case word modifying the noun word ti refers to an expression such as "○○ no ti." In step 522, the preprocessing result 1 of FIG. 4A can be used.

In step 523, the computer system (201) determines whether the predetermined threshold value th satisfies fc<th. The threshold value is, for example, 10% of the entire appearance frequency of the noun word ti. That is, if the noun word ti appears 10 times in the entire document, th=1. In the case where fc<th, the processing proceeds to step 524. In the case where fc≥th, the processing proceeds to step 525.

In step 524, the computer system (201) assigns the score D to the schema type Vs of the noun word ti. In the example of FIG. 5D, i=m.

In step 525, the computer system (201) assigns the score A to the component type Vc of the noun word ti. In the example of FIG. 5D, i=2. Note that C>D.

In step 526, the computer system (201) determines whether the processing of steps 521 to 525 has been performed on all of the noun words ti. If the processing has been performed, the processing proceeds to step 527 of FIG. 5E. If the processing has not been performed, the processing returns to step 521. Until the weight assignment has been finished for all of the noun words ti, the processing of steps 521 to 525 are repeated.

FIG. 5E shows an example of assigning weight to the seed expression and term candidate, according to the embodiment of the present invention. In step 527, of the seed expressions, the computer system (201) sets seed expressions appearing in the first row of the table as noun words t1, t2, ..., tm. An unprocessed seed expression is taken out from the seed expressions and set as the noun word ti.

In step 528, the computer system (201) determines, for all of the s-seed subsequences, whether the s-seed subsequence coincides with the type of the noun word ti. In step 528, the s-seed subsequence of FIG. 4B can be used. If the s-seed subsequence coincides with the type of the noun word ti, the processing proceeds to step 529. Otherwise, the processing proceeds to step 530.

In step 529, the computer system (201) assigns the score C to the schema type Vs of the noun word ti. In the example of FIG. 5E, i=1.

In step 530, the computer system (201) determines whether the processing of steps 527 to 529 has been performed on all of the noun words ti. If the processing has been performed, the processing proceeds to step 531 of FIG. 5F. If the processing has not been performed, the processing returns to step 527. Until the weight assignment has been finished for all of the noun words ti, the processing of steps 527 to 529 is repeated.

A specific example of the processing of FIG. 5E is as follows. Assume that the writing or reference corpus includes the phrases "kinourisuto" and "kinou no gaiyou." In response to "kinou" being inputted as the s-seed, being a word following the s-seed "kinou," the noun word "risuto" is added to the s-seed subsequence list. In a similar manner, in response to "kinou" being inputted as the s-seed, being a word modified by the s-seed "kinou" as a genitive case word, the noun word "gaiyou" is added to the s-seed subsequence list.

Next, assume that the document data includes phrases "botan A no kinou" and "botan B no kinou." The type of the s-seed "kinou" coincides with the type of "kinou" in "botan A no kinou" and the type of "kinou" in "botan B no kinou." Thus, the score C is assigned to the schema type Vs of the noun word "kinou."

In the above description, the steps (521 to 526) described with reference to FIG. 5D are performed, followed by the steps (527 to 530) described in FIG. 5E. However, the steps described in FIG. 5D and the steps described in FIG. 5E can be executed in reverse order or can be performed simultaneously.

Figure 5F:
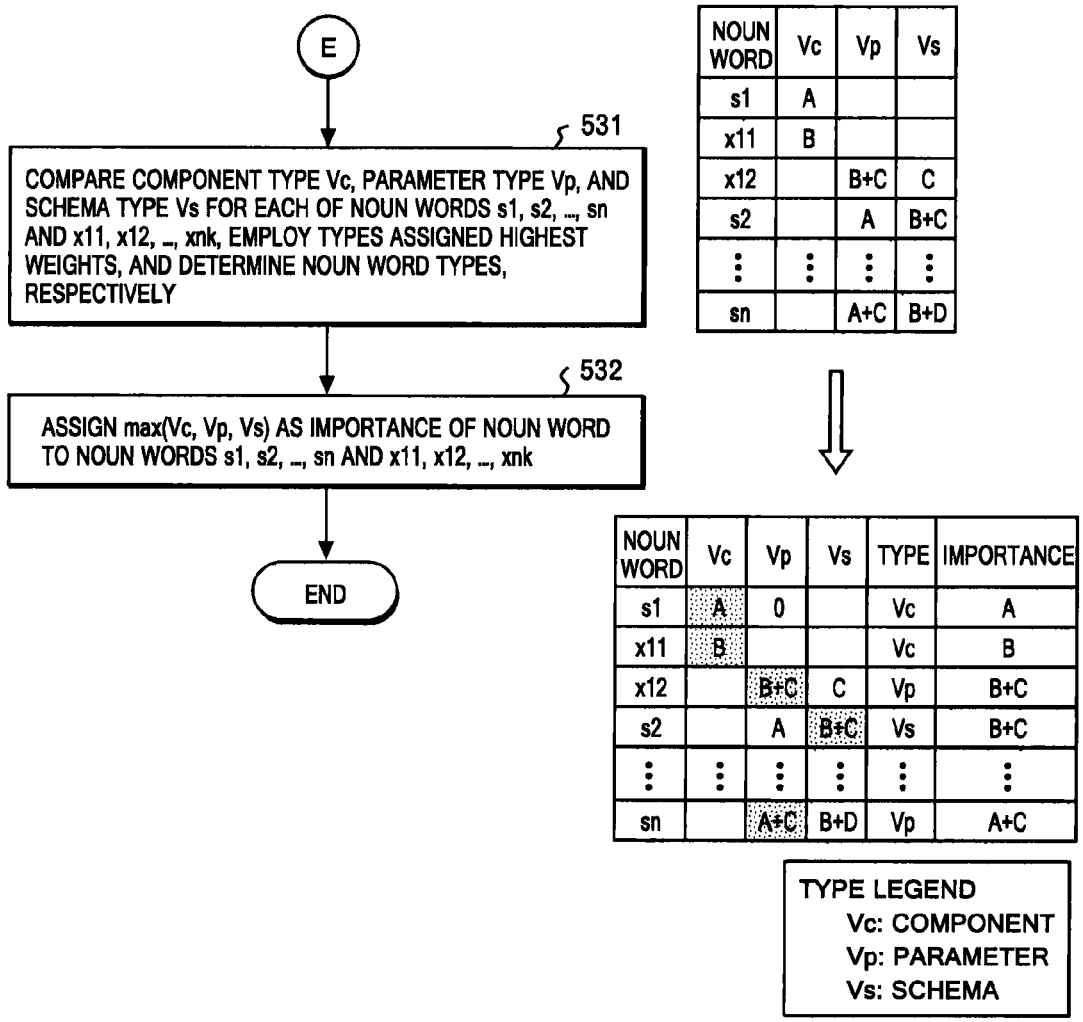
FIG. 5F shows a determination of the type of the noun word, according to the embodiment of the present invention.

FIG. 5F shows the determination of the type of the noun word, according to the embodiment of the present invention. In step 531, the computer system (201) compares the component type Vc, the parameter type Vp, and the schema type Vs for each of the seed expressions s1, s2, ..., sn and the term candidates x11, ..., xnk. Then, the computer system (201) employs the types having the highest weights, and determines them as the types of the seed expressions and the term candidates.

In the example shown in a table of FIG. 5F, the types of the seed expressions and the term candidates are as follows. The type of the seed expression s1 is determined to be the component type Vc since the component type Vc is assigned the score A only. The type of the term candidate x11 is determined to be the component type Vc since the component type Vc is assigned the score B only. For the term candidate x12, a score of B+C is assigned to the parameter type Vp and the score C is assigned to the schema type Vs. Since B+C>C, the type of the term candidate x12 is determined to be the parameter type Vp.

For the seed expression s2, the score A is assigned to the parameter type Vp and a score of B+C is assigned to the schema type Vs. Since the respective values of A, B, and C are arbitrary parameters which can differ depending on the language or the type of document, the type of the seed expression s2 is the schema type Vs if B+C>A, and is the parameter type Vp if A>B+C. Since it is assumed that B+C>A in the example of FIG. 5F, the type of the seed expression s2 is determined to be the schema type Vs.

For the seed expression sn, a score of A+C is assigned to the parameter type Vp and a score of B+D is assigned to the schema type Vs. Since A+C>B+D, the type of the seed expression sn is determined to be the parameter type Vp.

In step 532, the computer system (201) assigns max(Vc, Vp, Vs) as an importance of the extracted noun word to each of the seed expressions s1, s2, ..., sn and the term candidates x11, ..., xnk. Alternatively, the importance can be obtained as, for example, log F*T where F is the appearance frequency of each noun word and max(Vc, Vp, Vs)=T, in order to perform filtering by using the appearance frequency.

In the example shown in the table of FIG. 5F, max(Vc, Vp, Vs) is assigned as the importance of the seed expression and the term candidate. The importance of the seed expression s1 is A since the component type Vc is assigned the score A only.

The importance of the term candidate x11 is B since the component type Vc is assigned the score B only. For the term candidate x12, the score of B+C is assigned to the parameter type Vp and the score C is assigned to the schema type Vs. Since B+C>C, the importance of the term candidate x12 is B+C.

For the seed expression s2, the score A is assigned to the parameter type Vp and the score of B+C is assigned to the schema type Vs. As described above, the importance of the seed expression s2 is B+C if B+C>A, and is A if A>B+C. Since it is assumed that B+C>A in the example of FIG. 5F, the importance of the seed expression s2 is B+C.

For the seed expression sn, the score of A+C is assigned to the parameter type Vp and the score of B+D is assigned to the schema type Vs. Since A+C>B+D, the importance of the seed expression sn is A+C.

FIGS. 6A to 6E show an example to which the conventional extraction technique is applied, and an example to which the present invention is applied.

FIG. 6A shows a result of a noun word extraction according to a conventional method.

The document of FIG. 6A is documentation for a mobile phone, and is accordingly an example of the technical document. The documentation describes components and functions while using a drawing and a table.

By using the conventional noun word extraction technique, all of the noun words in the documentation are extracted. In FIG. 6A, the extracted noun words are shown in italics with underlines.

FIG. 6B shows a result of seed expression extraction according to the example of the present invention. The computer system (201) extracts a noun word taking up an entire segment in the documentation as a seed expression which is definite as a technical term.

In the example, the text segments include characters in the drawing (text segment in a drawing) and characters in the table (text segment formed of a cell in a table). Thus, "disupurei (display)," "botan A," and "botan B" in the drawing and table, and "ID," "meishou (name)," and "iro" in the table are extracted as the seed expressions. In FIG. 6B, the seed expressions are shown in italics with underlines.

FIG. 6C shows a result of the term candidate extraction based on the seed expression using the text processing information, according to the example of the present invention. Based on an expression "botan A . . . osu," for example, the computer system (201) collects a word modifying the same word as a verb word "osu (push)" modifying the seed expression "botan A." The documentation includes a sentence "botan X . . . osu." Thus, the computer system (201) extracts "botan X" of the sentence "botan X . . . osu" as the term candidate. Based on an expression "botan A no iro ha . . . ," the computer system (201) assigns a score to the component Vc of "botan A."

In this manner, the computer system (201) performs the seed expression extraction, the term candidate extraction, and the weight assignment for each type of respective terms, and outputs each term in association with any one of the predetermined types (Vc, Vp, Vs).

In FIG. 6C, a noun word classified as the component type Vc, a noun word classified as the parameter type Vp, and a noun word classified as the schema type Vs are respectively shown in italic with a single underline, with a box, and with a double underline.

FIG. 6D shows processing of calculating weights in the example of the present invention. In the example, the following values are previously set in the computer system for the respective scores: score W=100, score X=70, score Y=40, score Z=10, score A=100, score B=70, score C=40, and score D=10. Noun words "jouhou (information)," "denwa (call)," "kinou," and "keitaitanmatsu (mobile terminal)" are not seed expressions since the scores are less than the predetermined threshold value.

The computer system (201) extracts noun words "disupurei," "botan A," "botan B," "iro," "ID," and "meishou" as the seed expressions in accordance with the steps shown in FIGS. 3A and 3B. The weights these seed expressions are respectively as shown in FIG. 6D (i.e., "2W+3Z," "2W+2Z," "2W+3Z," "Z," "W+2Z," "W," and "W," respectively).

The noun word "botan X" is the term candidate from the seed expression which is obtained by the steps shown in FIG. 5B.

The computer system (201) assigns respective weights of the component Vc, the parameter Vp, and the schema Vs for each seed expression and each term candidate in accordance with the steps shown in FIGS. 5A to 5F. The computer system (201) determines max(Vc, Vp, Vs) for each seed expression and each term candidate. The computer system (201) determines the type of the seed expression and the term candidate based on the obtained max(Vc, Vp, Vs). In FIG. 6D, a shaded portion shows the determined classification for each noun word.

Further, the computer system (201) obtains the importance of the seed expression and the term candidate based on the obtained max(Vc, Vp, Vs).

FIG. 6E shows comparison between the result of the conventional noun word extraction and the result of the noun word extraction according to the example of the present invention.

As shown by the result of the conventional noun word extraction, an expression of low appearance frequency can be a term to be extracted in a technical document. Thus, many terms are enumerated by a simple frequency-based extraction method. On the other hand, according to the embodiment of the present invention, it is possible to determine which one of multiple types a technical term belongs to and output the technical term in association with the determined type. A term list classified by each type can help a user understand the content of a technical document having a tremendous amount.

Figure 7:
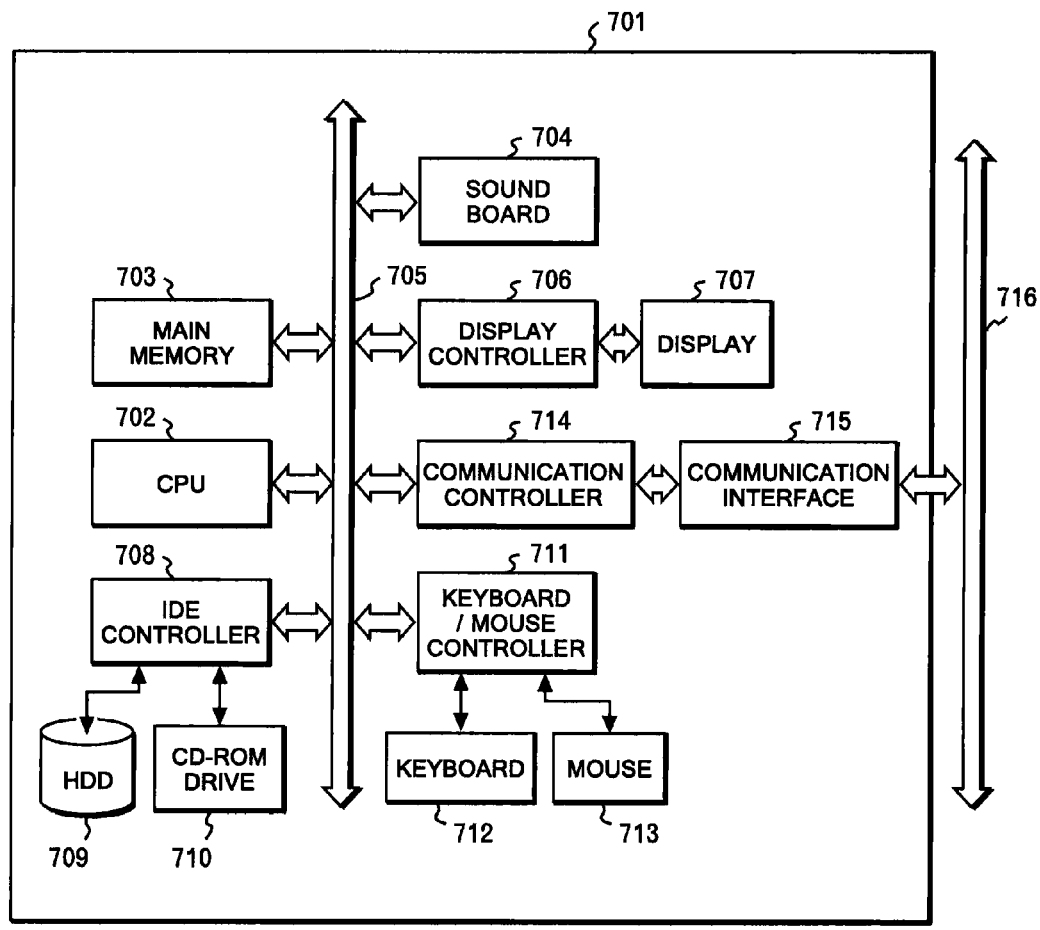
FIG. 7 shows a block diagram of computer hardware of the embodiment of the present invention.

FIG. 7 shows a block diagram of the computer hardware of the embodiment of the present invention. A computer system (701) according to the example of the present invention includes a CPU (702) and a main memory (703) which are connected to a bus (705). The CPU (702) is preferably based on architecture of 32 bits or 64 bits. Usable as the CPU (702) are, for example, Xeon (trademark) series, Core (trademark) series, Atom (trademark) series, Pentium (trademark) series, and Celeron (trademark) series of Intel Corporation, Phenom (trademark) series, Athlon (trademark) series, Turion (trademark) series, and Sempron (trademark) series of AMD, Inc., or the like. The bus (705) is connected with a sound card (704) as an interface for performing input/output of sound. The bus (705) is also connected with a display (707) such as an LCD monitor via a display controller (706). The display (707) is used for displaying information on software operated on the computer (701) with an appropriate graphic interface. The bus (705) is also connected with a hard disk or silicon disk (709) and a CD-ROM, DVD, or Blu-ray drive (710) via an IDE or SATA controller (708). The CD-ROM, DVD, or Blu-ray drive (710) is used for introducing a program from a CD-ROM, DVD-ROM, or BD to the hard disk or silicon disk (709) according to necessity. The bus (705) is further connected with a keyboard (712) and a mouse (713) via a keyboard/mouse controller (711) or via a USB controller (not shown).

A communication interface (715) conforms to, for example, an Ethernet (trademark) protocol. The communication interface (715) is connected to the bus (705) via a communication controller (714), plays a role of physically connecting the computer system (701) and a communication line (716), and provides a network interface layer to a TCP/IP communication protocol of a communication function of the operating system of the computer system (701). The communication line can be a wired LAN environment or a wireless LAN environment based on a wireless LAN connection standard such as, for example, IEEE 802.11a/b/g/n.

The present invention has been described above based on the embodiments. However, the content described in these embodiments are examples of the present invention, and it should be apparent to those skilled in the art that various modified examples are conceivable without departing from the technical scope of the present invention.

What is claimed is:

1. A computer-implemented system including a memory and a processor communicatively coupled to the memory for extracting terms from electronic document data that includes a text segment, the computer system comprising:
    a first extraction unit that uses a first text processing information to extract a noun word from the document data;
    a second extraction unit that uses a second text processing information to extract a term candidate in relation to the extracted noun word from the document data or from a corpus that includes text data described in the same language used in the document data;
    a weight assignment unit that, in order to determine which one of a plurality of noun word types the extracted noun word and the extracted term candidate each belong to, uses a third text processing information to select which type to assign a weight from the plurality of types and assigns the weight to the selected type for each of the extracted noun word and the extracted term candidate;
    a determination unit that determines the type to which the extracted noun word and the extracted term candidate each belong, based on the assigned weight; and
    an output unit which follows the determination to output the extracted noun word and the extracted term candidate each in association with the determined type,
    wherein the weight assignment unit uses the third text processing information to select which type to assign the weight from the plurality of types and assigns the weight to the selected type for each of the extracted noun word and the extracted term candidate by:
    obtaining a number of times a genitive case word modifies the extracted noun word and a number of times a genitive case word modifies the extracted term candidate, in the document data or in the corpus including the text data described in the same language used in the document data; and
    selecting the type to be assigned a weight according to whether or not the obtained number of times is in a predetermined threshold value range.

2. The computer-implemented system according to claim 1, wherein:
    the first text processing information is selected from the group consisting of: a document structure information, a language superficial information, a language part-of-speech information, and a morphological analysis information; and
    the second text processing information, the third text processing information, and the fourth text processing information are word modification information.

3. The computer-implemented system according to claim 1, wherein:
    the first extraction unit uses the first text processing information to extract the noun word from the document data by performing a morphological analysis on the document data to extract noun words ($K_i$ ($i=1, 2, \ldots, n$)); and
    the first extract unit further assigns, to each of the extracted noun words $K_i$, a weight corresponding to at least one of a position and a proportion of the noun word $K_i$ in the document data.

4. The computer-implemented system according to claim 3, wherein:
    the weight assignment corresponding to the position of each noun word $K_i$ in the document data is to assign a weight corresponding to whether the noun word $K_i$ is in a sentence, in the text segment, or in a parenthesis; and
    the weight assignment corresponding to the proportion of each noun word $K_i$ in the document data is to assign a weight corresponding to whether the noun word $K_i$ occupies a predetermined proportion of the text segment or of a character string in the parenthesis.

5. The computer-implemented system according to claim 3, wherein:
    when the position of the noun word $K_i$ is not in a sentence, a determination is made as to whether or not the noun word $K_i$ takes up the entire text segment;
    when the noun word $K_i$ takes up the entire text segment, a score W is assigned to the noun word $K_i$;
    when the noun word $K_i$ does not take up the entire text segment, a score Y is assigned to the noun word $K_i$;
    when the position of the noun word $K_i$ is in a sentence, a determination is made as to whether or not the noun word $K_i$ is in a parenthesis in the sentence and takes up the entire character string in the parenthesis;
    when the noun word $K_i$ is in the parenthesis and takes up the entire character string in the parenthesis, a score X is assigned to the noun word $K_i$; and
    when the noun word $K_i$ is not in a parenthesis or does not take up the entire character string, a score Z is assigned to the noun word $K_i$, wherein score W is greater than score X, score X is greater than score Y, and score Y is greater than score Z.

6. The computer-implemented system according to claim 3, wherein the first extraction unit further:
    collects the same noun words from the noun words $K_i$ and sets the same noun words as a certain one of noun words $S_i$ ($i=1, 2, \ldots, k$) ($n \geq k$);
    assigns a weight to each of the noun words $S_i$ based on the weights assigned to the corresponding noun words $K_i$; and
    extracts the noun word $S_i$ assigned a weight equal to or greater than a predetermined threshold value.

7. The computer-implemented system according to claim 6, wherein:
    the first extraction unit determines whether or not the weight of each noun word $S_i$ is in a predetermined threshold value range; and
    when the weight of the noun word $S_i$ is in the predetermined threshold value range, the first extraction unit determines whether or not a character type of the noun word $S_i$ is adequate as a term;

when determining the character type as adequate, the first extraction unit sets the noun word Si as a noun word to be extracted;

when determining the character type as inadequate, the first extraction unit sets the weight of the noun word Si to zero; and when the weight of the noun word Si is not in the predetermined threshold value range, the first extraction unit sets the weight of the noun word Si to zero.

8. The computer-implemented system according to claim 7, wherein:

the first extraction unit determines the character type of the noun word Si as inadequate when the character type is any one of a number, symbol, or hiragana or a combination of only the number and the symbol.

9. The computer-implemented system according to claim 1, wherein:

the second extraction unit extracts a term candidate satisfying a predetermined grammar requirement from the document data or from the corpus including the text data described in the same language used in the document data.

10. The computer-implemented system according to claim 9, wherein:

the extraction of the term candidate satisfying the predetermined grammar requirement includes identifying a verb word for which the extracted noun word is a direct object and extracting a noun word which is an object of the same verb word as the identified verb word, in the document data or in the corpus including the text data described in the same language used in the document data.

11. The computer-implemented system according to claim 1, wherein:

the plurality of types are a component type (Vc), a parameter type (Vp), and a schema type (Vc);

the component type Vc represents a level of a term belonging to a component;

the parameter type Vp represents a level of a term representing a parameter; and the schema type Vs represents a level of a term representing a schema.

12. The computer-implemented system according to claim 11, wherein the weight assignment unit further:

assigning a score A to the component type Vc for the extracted noun word when the number of times obtained for the extracted noun word is lower than the predetermined threshold value; and assigning the score A to the parameter type Vp and the schema type Vs for the extracted noun word when the number of times obtained for the extracted noun word is the predetermined threshold value or greater.

13. The computer-implemented system according to claim 12, wherein the weight assignment unit further:

assigns a score B to the component type Vc for the extracted term candidate when the number of times obtained for the extracted term candidate is lower than the predetermined threshold value; and assigns the score B to the parameter type Vp and the schema type Vs for the extracted term candidate when the number of times obtained for the extracted term candidate is the predetermined threshold value or greater, wherein score A is greater than score B.

14. The computer-implemented system according to claim 13, wherein the second extraction unit uses the second text processing information to extract the term candidate in relation to the extracted noun word from the document data or from the corpus that includes text data described in the same language used in the document data by identifying a verb word for which the extracted noun word is a direct object and extracts a noun word NPi which is an object of the same verb word as the identified verb word, from the document data or from the corpus including the text data described in the same language used in the document data; and the weight assignment unit further assigns a score C to the parameter type Vp for the extracted noun word when the noun word NPi includes a number, wherein score B is greater than score C.

15. The computer-implemented system according to claim 14, wherein the weight assignment unit further:

obtains a number of times a genitive case word modifies a noun word ti which, out of the extracted noun words, appears in a first row of the text segment of the document data, in the document data or the corpus including the text data described in the same language used in the document data; and selects the type to be assigned a weight according to whether the obtained number of times is in a predetermined threshold value range.

16. The computer-implemented system according to claim 15, wherein the weight assignment unit further:

assigns a score D to the schema type Vs for the extracted noun word corresponding to the noun word ti when the number of times obtained for the noun word ti is lower than the predetermined threshold value; and assigns the score A to the component type Vc for the extracted noun word corresponding to the noun word ti when the number of times obtained for the noun word ti is the predetermined threshold value or greater, wherein score A is greater than score B, score B is greater than score C, score C is greater than score D.

17. The computer-implemented system according to claim 16, wherein the weight assignment unit further:

obtains, in response to a list input of a term (s-seed) as a possible schema, frequencies of a noun word following the s-seed and a noun word modified by the s-seed as a genitive case word, in the document data or in the corpus including the text data described in the same language used in the document data, and stores in a list the noun word the frequency of which is one or more, out of the noun word following the s-seed and the noun word modified by the s-seed as a genitive case word.

18. The computer-implemented system according to claim 17, wherein the weight assignment unit further assigns the score D to the component type Vc for the extracted noun word corresponding to the noun word ti when the noun word ti which, out of the extracted noun words, appears in the first row of the text segment of the text data coincides with the noun word stored in the list.

* * * * *